(12) United States Patent
Tanifuji

(10) Patent No.: US 11,580,282 B2
(45) Date of Patent: Feb. 14, 2023

(54) MULTILAYER FLUID ANALYSIS PROGRAM, AND MULTILAYER FLUID ANALYSIS SYSTEM

(71) Applicants: HASL CO., LTD., Tokyo (JP); ZHEJIANG JINGCHENG MOLD MACHINERY CO., LTD., Zhejiang (CN)

(72) Inventor: Shinichiro Tanifuji, Tokyo (JP)

(73) Assignees: HASL CO., LTD., Tokyo (JP); ZHEJIANG JINGCHENG MOLD MACHINERY CO., LTD., Taizhou (CN)

( * ) Notice: Subject to any disclaimer, the term of this patent is extended or adjusted under 35 U.S.C. 154(b) by 373 days.

(21) Appl. No.: 16/826,507

(22) Filed: Mar. 23, 2020

(65) Prior Publication Data
US 2021/0294947 A1    Sep. 23, 2021

(51) Int. Cl.
*G06F 30/28*    (2020.01)
*G01N 25/00*    (2006.01)
(Continued)

(52) U.S. Cl.
CPC ............. *G06F 30/28* (2020.01); *G01B 21/08* (2013.01); *G01N 11/00* (2013.01); *G01N 25/00* (2013.01);
(Continued)

(58) Field of Classification Search
CPC .......... G06F 30/28; G06F 30/23; G06F 17/12; G06F 17/13; G06F 2111/10; G01B 21/08; G01N 11/00; G01N 25/00
See application file for complete search history.

(56) References Cited

U.S. PATENT DOCUMENTS

| | | | |
|---|---|---|---|
| 9,081,923 B1* | 7/2015 | Hsu | G06F 30/23 |
| 2014/0156237 A1* | 6/2014 | Chang | B29C 45/7693 703/2 |
| 2019/0152114 A1* | 5/2019 | Chang | G06F 30/23 |

FOREIGN PATENT DOCUMENTS

| | | |
|---|---|---|
| JP | 2005-280033 A | 10/2005 |
| JP | 2009-113406 A | 5/2009 |

OTHER PUBLICATIONS

Zhang M, Jia Y, Sun S, Zhao G. Three-dimensional nonisothermal simulation of multi-layer extrusion processes of polymer melts. Polymer-Plastics Technology and Engineering. Nov. 1, 2006;45(11):1257-62. (Year: 2006).*

(Continued)

*Primary Examiner* — Chuen-Meei Gan
(74) *Attorney, Agent, or Firm* — Oliff PLC

(57) ABSTRACT

A computer-readable non-transitory storage medium stores a multilayer fluid analysis program for analyzing a multilayer fluid as 2.5 dimensions in which each layer is divided into elements and each of the elements has information about a layer thickness in a finite element model for the multilayer fluid. The multilayer fluid analysis program allowing a computer to function as: a layer thickness calculation process for calculating the layer thickness of the elements from a simultaneous equation indicating a relationship between stress in a normal direction and a fluid viscosity in the elements without considering a fluid flow in a thickness direction of the layer thickness under a condition that stresses in the normal direction and a tangential direction are balanced at an interface of respective layers and a flow velocity at the interface is continuous; and a display process for displaying a calculation result.

3 Claims, 21 Drawing Sheets

(51) Int. Cl.
    *G01B 21/08* (2006.01)
    *G06F 17/12* (2006.01)
    *G06F 30/23* (2020.01)
    *G06F 17/13* (2006.01)
    *G01N 11/00* (2006.01)
    *G06F 111/10* (2020.01)

(52) U.S. Cl.
    CPC .............. *G06F 17/12* (2013.01); *G06F 17/13* (2013.01); *G06F 30/23* (2020.01); *G06F 2111/10* (2020.01)

(56) References Cited

OTHER PUBLICATIONS

McIntyre A, Brush LN. Spin-coating of vertically stratified thin liquid films. Journal of fluid mechanics. Mar. 2010;647:265-85. (Year: 2010).*
Anturkar NR, Papanastasiou TC, Wilkes JO. Stability of multilayer extrusion of viscoelastic liquids. AlChE journal. May 1990;36(5):710-24. (Year: 1990).*
Puissant et al.; "Two-Dimensional Multilayer Coextrusion Flow in a Flat Coat-Hanger Die. Part I: Modeling;" Polymer Engineering and Science; 1994; pp. 201-208; vol. 34, No. 3.
Anturkar et al.; "Lubrication Theory For n-layer Thin-Film Flow wtih Applications to Multilayer Extrusion and Coating;" Chemical Engineering Science; 1990; pp. 3271-3282 vol. 45, No. 11.
Mahesh Gupta; Comparison of Mesh Partitioning Technique with Level-Set Method for Coextrusion Simulation; SPE ANTEC; 2014; pp. 1013-1020.

* cited by examiner

| Condition | Equation number | Simultaneous conditional equation |
|---|---|---|
| Lower wall non-slip | 3 | $B_i^1 = 0$ |
| Velocity continuity on interface | $3(n-1)$ | $-A_i^l \alpha^l - B_i^l + B_i^{l+1} = p_{,i}^l \beta^l$ |
| Shear stress continuity on interface | $3(n-1)$ | $-A_i^l + A_i^{l+1} = p_{,i}^l h^l$ |
| Upper wall non-slip | 3 | $-A_i^n \alpha^n - B_i^n = p_{,i}^n \beta^n$ |
| Total 6n | | |

Die 1 (L1)
30 kg/h, 1000 Pa·s

Die 2 (L2)
30 kg/h, 3000 Pa·s

Die 3 (L3)
30 kg/h, 2000 Pa·s

MULTILAYER FLUID ANALYSIS PROGRAM, AND MULTILAYER FLUID ANALYSIS SYSTEM

BACKGROUND

The present invention relates to a multilayer fluid analysis program, and a multilayer fluid analysis system.

In recent years, a numerical analysis technology for a co-extrusion process has been studied in the past, and there is a viscoelastic flow analysis using a three-dimensional (3D) numerical analysis method. However, many of analysis methods correspond to basic research content, and there are a small number of practicable 3D analyses for resin molding apparatus.

SUMMARY

For example, in film molding using a T-die, there has been a known T-die design method using a multilayer film molding simulation (for example, Japanese Patent Application Publication No. 2009-113406A). As to the multilayer film molding simulation, a flow velocity distribution in a width direction of each layer is calculated from a constitutive equation indicating a relationship between a viscosity, a shear rate, and a temperature, and a distribution of a thickness ratio in the width direction of each layer is calculated based on the flow velocity distribution, a shape of the die, and an extrusion amount of each layer.

In addition to the 3D analysis, a 2.5-dimensional analysis may be used as a fluid analysis method (for example, Japanese Patent Application Publication No. 2005-280033A). The amount of calculation is significantly increased in the 3D analysis, and thus the 3D analysis is not suitable for an actual molding technology. However, the 2.5-dimensional analysis has advantages that the amount of calculation is reduced compared with the 3D analysis. In a method of analyzing an injection molded product of JP 2005-280033A, a deformation amount is calculated from an initial condition of a temperature distribution in a product shell model, and a final product shape is displayed.

The 3D fluid analysis has not been put to practical use in a field of multilayer fluid analysis. Since mesh generation and an analysis method are complex due to the requirement of complicated re-meshing process, a huge amount of calculation needs to be performed to obtain an accurate analysis result, which requires a lot of time to output a calculation result. In addition, when the calculation time is shortened to a level where the 3D fluid analysis can be put to practical use, the accuracy of output analysis data decreases.

In the case of analyzing a multilayer fluid of a film, etc. in three dimensions, a large amount of time is required for a mesh division. Even when an auto-mesh function that can automatically perform mesh division is used, it is difficult to define a mesh boundary coincident with each layer boundary in the multilayer fluid of a thin object such as the film. In the 3D fluid analysis of the multilayer fluid, it is necessary to define the mesh boundary at each layer boundary of respective layers since physical properties are different for each layer. However, an accurate mesh division that can be used for the analysis is difficult in the conventional auto-mesh function. Therefore, in order to obtain a high-precision calculation result in the analysis of the 3D multilayer fluid, a human operation is necessary for performing accurate mesh division, and the operation time is enlarged.

As to the fluid analysis of the thin object such as the film, a single layer fluid analysis can be performed by the 3D fluid analysis method to some extent. However, the 3D fluid analysis in the multilayer fluid has not been put to practical use for the reasons described above. Consumers have demanded a high-precision multilayer fluid analysis program that does not require a long time until the calculation result is obtained.

Although, the fluid analysis in 2.5 dimensions is a scheme adopted as a basic technology of plastic injection molding as shown in JP 2005-280033A, a frequency of use is reduced in this field. Since such analysis presumes a developed pressure gradient flow, this scheme is not suitable for analyzing a problem that emphasizes three-dimensionality.

In view of the above background, the present inventor has established a method for performing a multilayer fluid analysis as a 2.5-dimensional analysis in which each element in a finite element method is provided with thickness information for a thin object such as a film molded by a T-die, a spiral mandrel die, or other molding system.

An object of the invention is to provide a multilayer fluid analysis program, and a multilayer fluid analysis system capable of performing analysis in a flow direction (MD) and a width direction (TD) of a multilayer fluid with high accuracy by 2.5-dimensional analysis.

In order to attain the above and other objects, the invention provides a computer-readable non-transitory storage medium storing a multilayer fluid analysis program for analyzing a multilayer fluid as 2.5 dimensions in which each layer is divided into elements and each of the elements has information about a layer thickness in a finite element model for the multilayer fluid. The multilayer fluid analysis program allowing a computer to function as a layer thickness calculation process for calculating the layer thickness of the elements from a simultaneous equation indicating a relationship between stress in a normal direction and a fluid viscosity in the elements without considering a fluid flow in a thickness direction of the layer thickness under a condition that stresses in the normal direction and a tangential direction are balanced at an interface of respective layers and a flow velocity at the interface is continuous, and a display process for displaying a calculation result of the layer thickness calculation process for each layer in a flow direction and a width direction of the multilayer fluid from an upstream side of a junction of each layer to a downstream side of the junction.

Preferably, the layer thickness is calculated in the layer thickness calculation process by solving a balance equation of the stress in the normal direction represented by the following simultaneous equation:

$$-p^l + 2\eta_{vis}^l \frac{1}{h^l} \frac{dh^l}{dt} = -p^{l+1} + 2\eta_{vis}^{l+1} \frac{1}{h^{l+1}} \frac{dh^{l+1}}{dt} \text{ for } l = 1 \sim n-1 \quad \text{[Formula 1]}$$

where p denotes a pressure in each layer, η denotes a viscosity, h denotes a layer thickness, l denotes a layer number, and the Formula 1 is a simultaneous differential equation in which layers are simultaneous from a first layer to an lth layer.

According to another aspect, the invention provides a computer-readable non-transitory storage medium storing a multilayer fluid analysis program for analyzing a multilayer fluid as 2.5 dimensions in which each layer is divided into elements and each of the elements has information about a layer thickness in a finite element model for the multilayer fluid. The multilayer fluid analysis program allowing a computer to function as: a heat flow calculation process for calculating heat flow data of the elements from an equation indicating a relationship between a flow rate and a surface area in the elements without considering a fluid flow in a thickness direction of the layer thickness under a condition that stresses in a normal direction and a tangential direction are balanced at an interface of respective layers and a flow velocity at the interface is continuous; and a display process for displaying a calculation result of the heat flow calculation process for each layer in a flow direction and a width direction of the multilayer fluid from an upstream side of a junction of each layer to a downstream side of the junction.

According to another aspect, the present invention provides a multilayer fluid analysis system for analyzing a multilayer fluid as 2.5 dimensions in which each layer is divided into elements and each of the elements has information about a layer thickness in a finite element model for the multilayer fluid. The system includes a layer thickness calculation unit and the display unit. The layer thickness calculation unit is configured to calculate the layer thickness of the elements from an equation indicating a relationship between stress in a normal direction and a fluid viscosity in the elements without considering a fluid flow in a thickness direction of the layer thickness under a condition that stresses in the normal direction and a tangential direction are balanced at an interface of respective layers and a flow velocity at the interface is continuous. The display unit is configured to display a calculation result of the layer thickness calculation unit for each layer in a flow direction and a width direction of the multilayer fluid from an upstream side of a junction of each layer to a downstream side of the junction.

BRIEF DESCRIPTION OF DRAWINGS

The particular features and advantages of the invention as well as other objects will become apparent from the following description taken in connection with the accompanying drawings, in which.

DETAILED DESCRIPTION OF THE PREFERRED EMBODIMENTS

Figure 1:
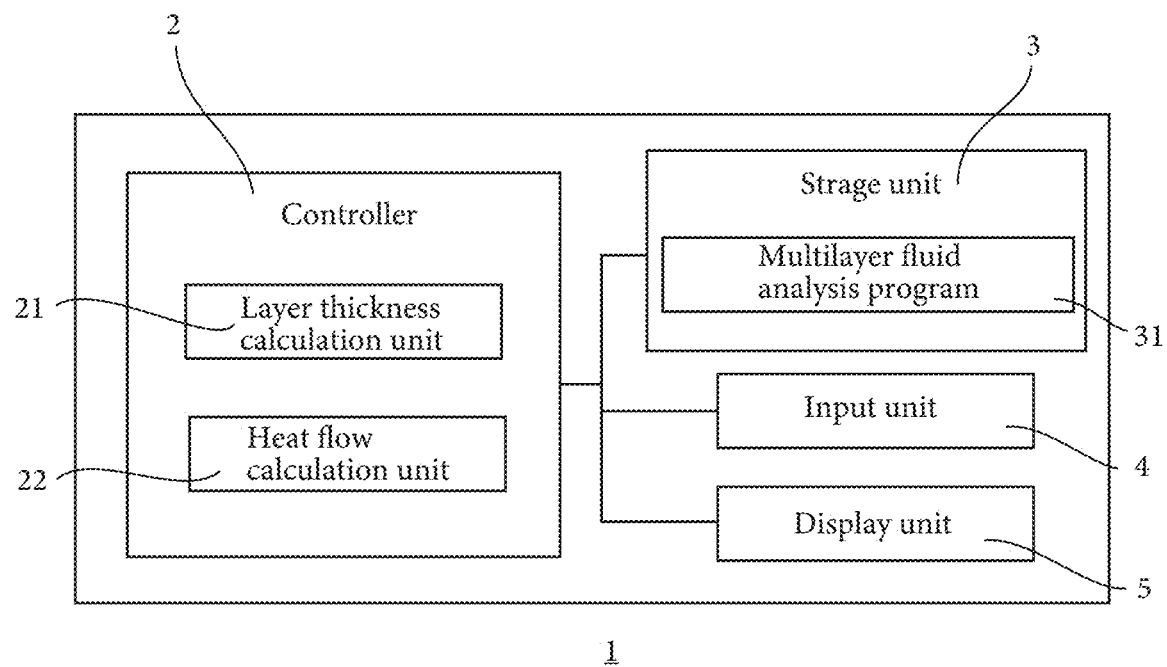
FIG. 1 is a block diagram illustrating a multilayer fluid analysis system according to the embodiment.

A description will be given for a multilayer fluid analysis system 1 according to an embodiment of the invention with reference to FIGS. 1 to 21. As illustrated in FIG. 1, the multilayer fluid analysis system 1 includes a controller 2, a storage unit 3, an input unit 4, and a display unit 5. The multilayer fluid analysis system 1 executes a multilayer fluid analysis program 31 installed in the storage unit 3 to perform a multilayer fluid analysis at the time of film production using a T-die, a spiral mandrel die, etc.

The controller 2 is a CPU (Central Processing Unit) and loads various applications such as an operating system (OS) stored in the storage unit 3. The controller 2 includes a layer thickness calculation unit 21 and a heat flow calculation unit 22. The layer thickness calculation unit 21 calculates a layer thickness of each layer in a multilayer fluid, and the heat flow calculation unit 22 calculates various data related to a heat flow such as a temperature, a pressure, a flow rate, and flow velocity, etc. of each layer in the multilayer fluid.

The storage unit 3 includes a hard disk drive (HDD), a read only memory (ROM), and a random access memory (RAM). The HDD stores various applications such as the multilayer fluid analysis program 31, physical property data required for the fluid analysis, etc. The RAM is a volatile memory and is used as a working area of such program.

The input unit 4 is an input interface for inputting an operation by a user using the multilayer fluid analysis system 1, and includes a pointing device such as a mouse, a keyboard, a touch panel, etc.

Figure 3:
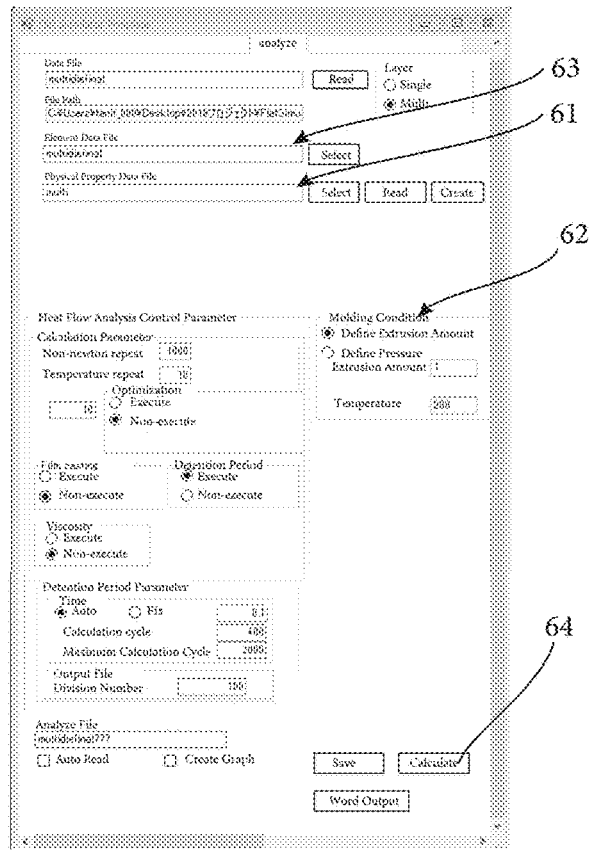
FIG. 3 is a condition input window displayed in a display unit of the multilayer fluid analysis system according to the embodiment.
Figure 4:
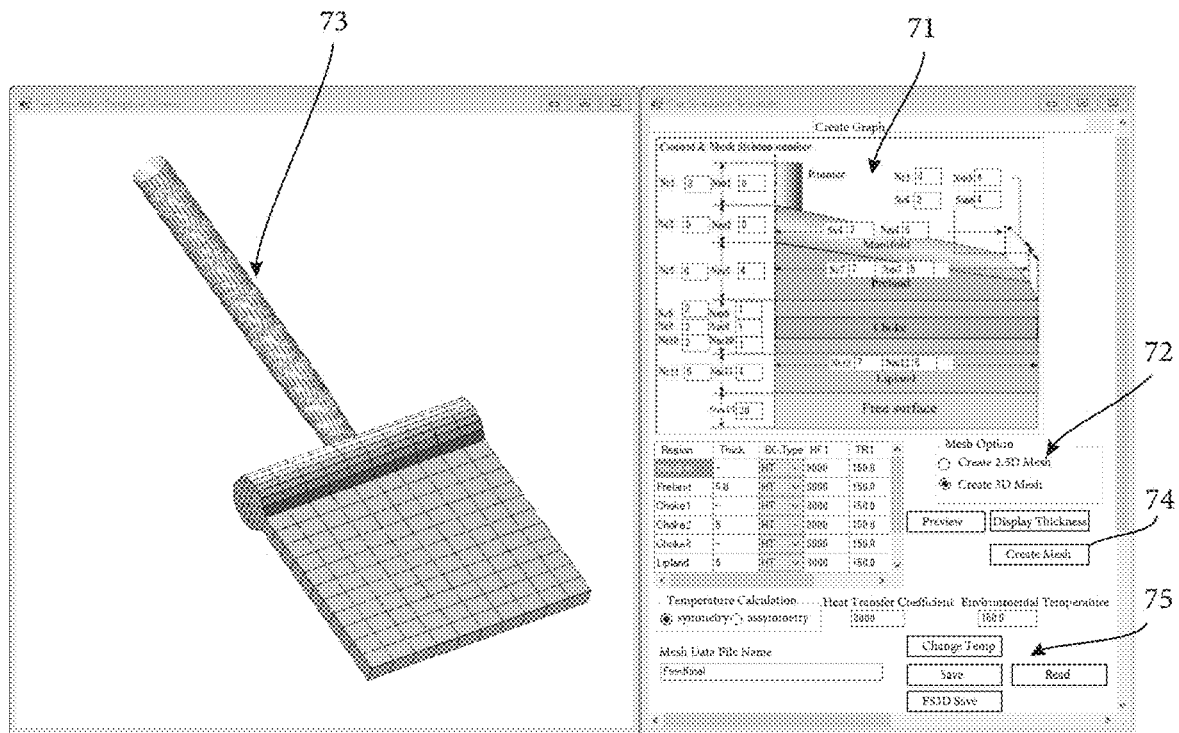
FIG. 4 is a T-die shape input window displayed in the display unit according to the embodiment.

The display unit 5 is a display that displays a graphical user interface (GUI) of the multilayer fluid analysis program 31 illustrated in FIGS. 3 and 4 and an analysis result illustrated in FIGS. 11 and 13 described later.

Figure 2:
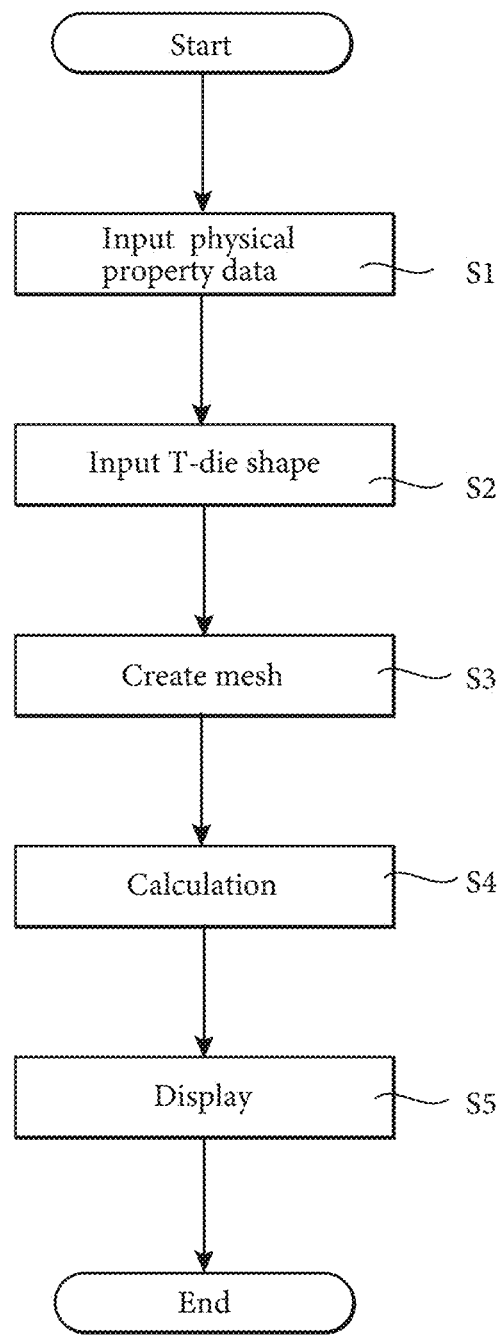
FIG. 2 is a flowchart illustrating the multilayer fluid analysis system according to the embodiment.

FIG. 2 illustrates a flowchart when the controller 2 executes the multilayer fluid analysis program 31. When the multilayer fluid analysis program 31 is activated, the controller 2 displays a condition input window 6 illustrated in FIG. 3 on the display unit 5 according to an operation of the input unit 4 by the user. The condition input window 6 includes a data reading portion 61 for designating and reading physical property data stored in the storage unit 3, a molding condition input portion 62 for inputting a molding condition, an element data reading portion 63, and a calculation button 64. The user inputs a desired physical property data into the data reading portion 61 and inputs a molding condition for an extruder into the molding condition input portion 62 (S1). Note that the condition for the extruder can be set for each layer. The user inputs element data to be analyzed stored in the storage unit 3 into the element data reading portion 63. When the element data is not stored, the element data is created in a T-die shape input window 7 illustrated in FIG. 4.

The user inputs a shape of the T-die through the input unit 4 into the T-die shape input window 7 displayed on the display unit 5. The T-die shape input window 7 includes a shape input portion 71, a dimension designation portion 72, a preview window 73, a mesh creation button 74, and a data storage portion 75. When the shape of the T-die is input in the shape input unit 71 and a display mode is designated by the dimension designation portion 72, a preview of the shape of the T-die is displayed in the preview window 73 (S2). In FIG. 4, since 3D mesh is designated in the dimension designation portion 72, a 3D mesh shape is displayed in the preview window 73.

Figure 5:
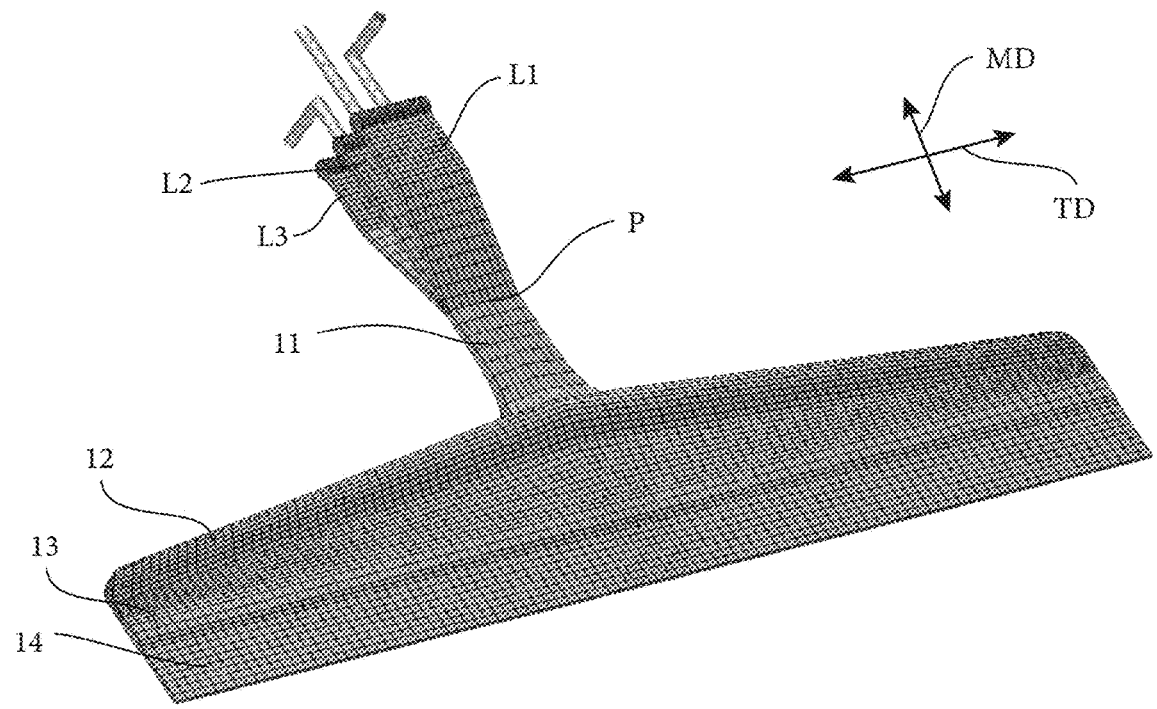
FIG. 5 is a diagram illustrating an element division for the T-die of the multilayer fluid analysis system according to the embodiment.

When the user inputs the T-die shape and presses the mesh creation button 74, the controller 2 creates a mesh (element division) of a multilayer film to be analyzed as illustrated in FIG. 5 (S3). In the embodiment, three layers fluid is analyzed as illustrated in the figures. Element division is performed for each layer such that positions of elements in the respective layers coincide with each other in a thickness direction, after the resin of each layer joins at a junction P. A first layer L1, a second layer L2, and a third layer L3 join at the junction P, pass through a resin inflow portion 11, spread in a transverse direction (hereinafter referred to as TD) at a manifold portion 12, slightly spread in the thickness direction at a choke portion 13, and thus are discharged from the T-die via a lip land portion 14. The created element data can be stored in the storage unit 3 by the data storage portion 75. Although a flow inside the T-die is illustrated in three dimensions to schematically represent the flow in FIG. 5, each element is analyzed as 2.5 dimensions so as to possess information in the thickness direction.

When the user presses the calculation button 64 of the condition input window 6, the controller 2 calculates a layer thickness and a heat flow in a machine direction (hereinafter referred to as MD) and the TD in each layer based on a value input into the condition input window 6 and the T-die shape input window 7 and stored in the storage unit 3 (S4). The MD corresponds to a flow direction of the invention, and the TD corresponds to the width direction of the invention.

Figure 6:
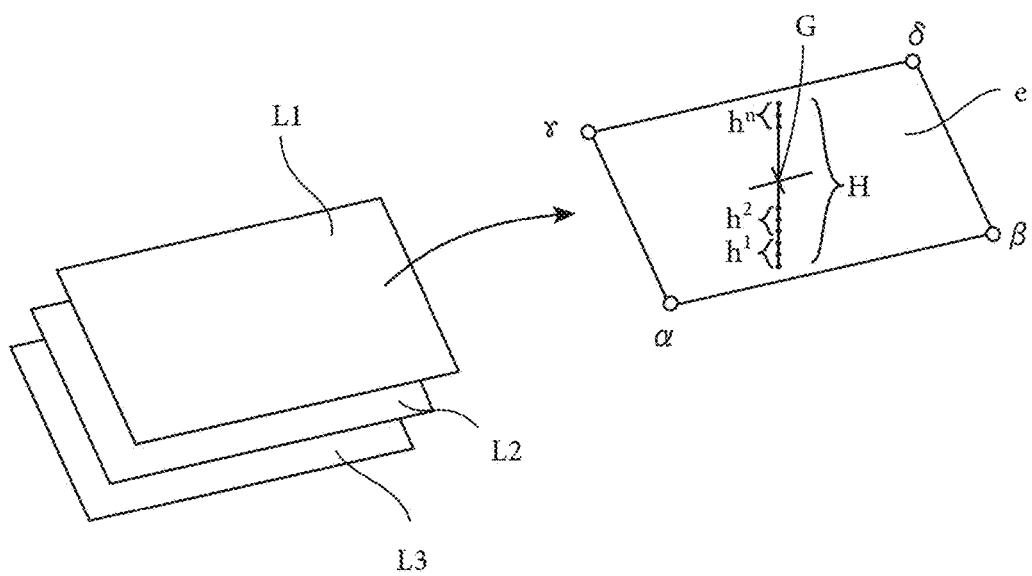
FIG. 6 is a diagram illustrating elements having thickness information according to the embodiment.

A description will be given of an element used in a calculation formula described later with reference to FIGS. 6 and 7. In the embodiment, since the fluid analysis is performed in 2.5-dimensional, an element e has information in the thickness direction as illustrated in FIG. 6. The element e has a substantially rectangular shape, the center of gravity G is defined at a substantially central portion thereof, and a node $\alpha$, a node $\beta$, a node $\gamma$, a node $\delta$ are defined at four corners. For the element e, a plurality of finite difference lattice points is defined in the thickness direction, and layer thicknesses $h^1$ to $h^n$ are defined as distances between the finite difference lattice points. The sum of the layer thicknesses $h^1$ to $h^n$ corresponds to a layer thickness H of the element e. The controller 2 disposes variables on the respective finite difference lattice points and performs fluid analysis. In the 2.5-dimensional fluid analysis in the embodiment, the flow of fluid in the thickness direction of the layer is not considered in each element.

Figure 7:
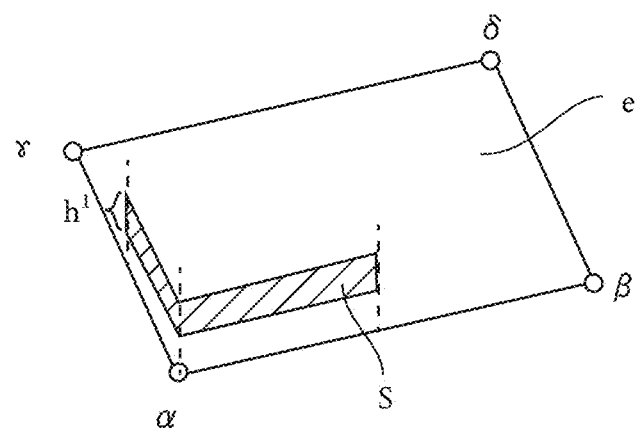
FIG. 7 is a diagram illustrating a flow rate and a surface area in the elements according to the embodiment.

As illustrated in FIG. 7, in the element e, a surface area S is defined as a value obtained by multiplying a distance between a midpoint of the node $\alpha$ and the node $\beta$ and a midpoint of the node $\alpha$ and the node $\gamma$ by the layer thickness h (hatched part in the figure). A flow rate per unit time passing through the surface area S is referred to as a flow rate Q. Initial values of the surface area S and the flow rate Q are calculated by the physical property data, a physical property value input to the condition input window 6, a value input to the T-die shape input window 7, etc.

Figure 8:
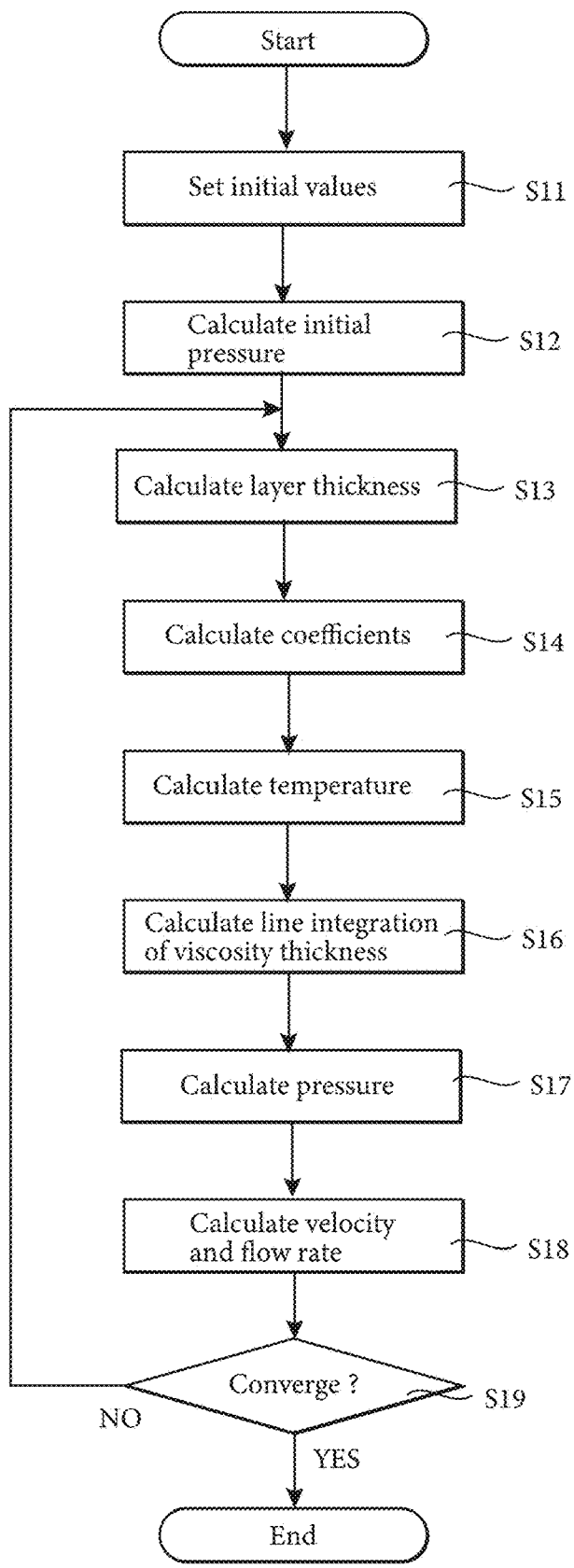
FIG. 8 is a flowchart of the calculation of the multilayer fluid analysis system according to the embodiment.

A detailed description will be given of calculation executed by the controller 2 in S4 with reference to FIG. 8. The controller 2 sets various physical property values and the shape of the T-die input in S1 and S2 as initial values (S11). In this instance, a layer thickness $h^l$ of each layer is calculated by the following Formula 2 using a flow rate $Q^l$ and an initial viscosity $\eta^{l,0}$. Here, a superscript l denotes a layer number. In addition, a superscript 0 (zero) denotes an initial value.

$$h^{l,0} = \frac{(\eta_{vis}^{l,0} Q^l)^{1/3}}{\sum_{i=1}^{n}(\eta_{vis}^{i,0} Q^i)^{1/3}} H \qquad \text{[Formula 2]}$$

In Formula 2, H is the layer thickness H of the element e illustrated in FIG. 6. In Formula 2, a layer thickness from the first layer to the third layer is set in inverse proportion to the ⅓ power of a layer flow rate. The viscosity is represented by a non-Newtonian pure viscosity model such as Power Law, Carreau, or Cross, and the initial viscosity $\eta^{1,0}_{vis}$ is the zero shear viscosity at a reference temperature of a nonlinear pure viscosity model. The controller 2 calculates a predetermined initial viscosity $\eta^{1,0}_{vis}$ from the parameters of the viscosity model stored in the storage unit 3, density, specific heat, and thermal conductivity.

The controller 2 calculates an initial layer pressure $p^{l,0}$ based on the following pressure equation (S12). Here, S denotes the surface area illustrated in FIG. 7, and Q denotes a flow rate of a fluid passing through the surface area S. The subscripts α and β denote node numbers.

$$S_{\alpha\beta}^{l,0} p_\beta^{l,0} + Q_\alpha^l = 0 \text{ for } l=1 \sim n \qquad \text{[Formula 3]}$$

In Formula 3, since the flow rate Q and the surface area S are known, the initial layer pressure $p^{l,0}$ at l=1 to n is calculated. For l=1 to n indicates a simultaneous equation from l=1 to l=n. The initial layer pressure $p^{l,0}$ is a provisional pressure and a value apart from an actual pressure. This value converges to a realistic value by looping the calculation in S19 (S19: NO).

The layer thickness calculation unit 21 calculates the layer thickness h by solving the following simultaneous equations based on the initial layer thickness h and the initial layer pressure p obtained by Formula 2 and Formula 3 (S13). A superscript k denotes the number of loops from S13 to S18 when it is determined not to converge in S19 (S19: NO).

$$H_\beta^e = \sum_{l=1}^n h_\beta^{l,k}, \qquad \text{[Formula 4]}$$

$$H_{\alpha\beta}^{l,k-1} h_\beta^{l,k} = H_{\alpha\beta}^{l+1,k-1} h_\beta^{l+1,k-1} + D_{\alpha\beta}(p_\beta^{l+1,k-1} - p_\beta^{l+1,k-1}) \qquad \text{[Formula 5]}$$
$$\text{for } l = 1 \sim n-1$$

As illustrated in FIG. 6, Formula 4 shows that the sum of the layer thicknesses $h^{l,k}_\beta$ from l=1 to n in the element is equal to the layer thickness H of the layer. Here, $H^e_\beta$ in the equation indicates the element layer thickness at the node β of the element e.

In Formula 5, D denotes a predetermined coefficient. At the first time of the first calculation, i.e., k=1, $H^{l+1,0}_{\alpha\beta}$, $h^{l+1,0}_\beta$, $p^{l,0}_\beta$, and $p^{l+1,0}_\beta$ on the right side have already calculated in S11 and S12. Since $h^{l,1}_\beta$ is unknown on the left side, and for l=1 to n, the number of unknowns is n. Here, since the number of interfaces between the respective layers in the case of the n-layer is n−1, the layer thickness h, which is the distance between the respective lattice points, is calculated by simultaneously combining Formula 5 and Formula 4.

[Normal Stress Balance]

Here, it is presumed that Formula 5 satisfies the following normal stress balance equation between adjacent layers.

$$-p^l + 2\eta^l_{vis} \frac{1}{h^l} \frac{dh^l}{dt} = -p^{l+1} + 2\eta^{l+1}_{vis} \frac{1}{h^{l+1}} \frac{dh^{l+1}}{dt} \text{ for } l = 1 \sim n-1 \qquad \text{[Formula 6]}$$

Figures 9, 10:
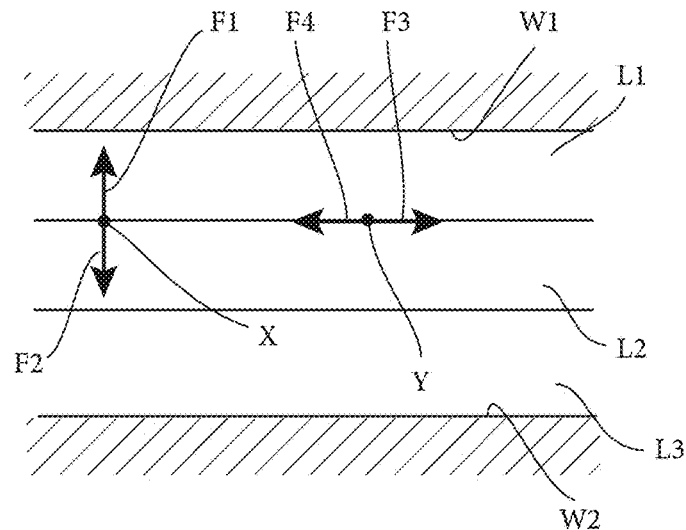
FIG. 9 is a diagram illustrating a stress balance between the layers according to the embodiment.
FIG. 10 is a diagram illustrating a simultaneous equation system of the multilayer fluid analysis system according to the embodiment.

As illustrated in FIG. 9, the normal stress balance refers to a state in which the stress F1 in the normal direction and the stress F2 in the opposite direction to that of the stress F1 at the node X are balanced at an interface between the first layer L1 and the second layer L2.

Since movement of the fluid in the thickness direction is not taken into account in the 2.5-dimensional fluid analysis, the total stress expressed by the sum of the pressure and the surplus stress calculated by a strain rate in the thickness direction, that is, a change rate of the thickness is in a balanced state between adjacent layers in Formula 6. That is, the sum of the pressure of a layer l and the surplus stress of the layer l is equal to the sum of the pressure of a layer l+1 and the surplus stress of the layer l+1. The surplus stress mentioned here means a general term for stress in the normal direction generated by a flow of fluid in each layer. The flow mentioned here is a flow of the fluid in a direction orthogonal to the thickness direction, and the flow in the thickness direction is not considered as described above.

The pressure equation of Formula 14 described later and Formula 6 are discretized using a method of weighted residual for an element surface area, thereby obtaining Formula 5 expressed in a matrix format.

[Balance of Stress in Shear Direction]

In the fluid analysis according to the embodiment, the problem is solved on the assumption that the pressure in each layer is different, and thus it is necessary to consider the balance of the tangential shear stress between the layers. The pressure of an i-coordinate component is expressed by the following equation of motion of the fluid.

$$\frac{\partial}{\partial h}\left(\eta_{vis} \frac{\partial u^l_i}{\partial h}\right) = p^l_{,i} \qquad \text{[Formula 7]}$$

In Formula 7, $u^l_i$, denotes a flow velocity of the i-coordinate component of the layer l, and denotes the pressure differentiated by the i-coordinate component of the layer l. Formula 8 is obtained by integrating Formula 7 with respect to the layer thickness h.

$$\eta^l_{vis} \frac{\partial u^l_i}{\partial h} = p^l_{,i} h + A^l_i \qquad \text{[Formula 8]}$$

In Formula 8, $A^l_i$ is an integration constant, and the right side represents the tangential shear stress. According to the embodiment, it is presumed that the tangential stress is balanced at the interface between the layers, and thus the following tangential stress balancing equation is satisfied between the respective layers.

$$\eta^l_{vis} \frac{\partial u^l_i}{\partial h}\bigg|_{h=h^l} = p^l_{,i} h^l_i + A^l_i = \eta^{l+1}_{vis} \frac{\partial u^{l+1}_i}{\partial h}\bigg|_{h=0} = A^l_{i+1} \text{ for } \qquad \text{[Formula 9]}$$
$$l = 1 \sim n-1$$

In Formula 9, $A^l_{i+1}$ is an integration constant. As illustrated in FIG. 9, the balance of the tangential stress refers to a state in which the tangential stress F3 and the stress F4 opposite to the stress F3 are balanced at the node Y at the interface between the first layer L1 and the second layer L2. From Formula 9, it is possible to obtain equations that guarantees a tangential stress balance on the interface (share stress continuity on interface) illustrated in FIG. 10.

[Continuity of Velocity at Interface]

Formula 9 is integrated with respect to the layer thickness h to obtain $u^l_i(h)$ corresponding to a velocity gradient in the i-coordinate component of the layer l.

$$u^l_i(h) = p^l_{,i} \int_0^h \frac{h}{\eta^l_{vis}} dh + A^l_i \int_0^h \frac{1}{\eta^l_{vis}} dh + B^l_i \qquad \text{[Formula 10]}$$

In Formula 10, $B^l_i$ is an integration constant. Considering a boundary condition without slippage of an upper wall surface W1 and a lower wall surface W2 in a flow channel illustrated in FIG. 9, a continuous condition of the flow velocity on the interface of the multilayer fluid in a layer n−1 is expressed by the following equation.

$$u_i^l(h^l) = p_{,i}^l \int_0^{h^l} \frac{h}{\eta_{vis}^l} dh + A_i^l \int_0^{h^l} \frac{1}{\eta_{vis}^l} dh + B_i^l = u_i^{l+1}(0) = B_i^{l+1}$$ [Formula 11]

for $l = 1 \sim n-1$

In Formula 11, when an integral value in the thickness direction is expressed by the following equation, it is possible to obtain a simultaneous equation system that guarantees velocity continuity at the interface (velocity continuity on interface) illustrated in FIG. 10.

$$\alpha^l = \int_0^{h^l} \frac{h}{\eta_{vis}^l} dh, \quad \beta^l \int_0^{h^l} \frac{h}{\eta_{vis}^l} dh$$ [Formula 12]

As illustrated in FIG. 10, the simultaneous equation system shown in the table can be obtained by the balance of the tangential stress at the interface obtained by Formula 9, the continuity of the velocity at the interface obtained by Formula 11 and Formula 12, and the boundary condition at the upper wall surface W1 and the lower wall surface W2 of the flow channel. In the embodiment, since the integration coefficients are $A^l_i$ and $B^l_i$ and are three-dimensional (i=1 to 3), six variables are defined as unknowns. When the number of layers is n, the unknown is 6n.

In S14, coefficients $A^{l,k}$ and $B^{l,k}$ are calculated by calculating the solution of this simultaneous equation system based on the initial layer pressure p calculated in S12, the layer thickness h calculated in S13, and the initial viscosity η set in S11 by the layer thickness calculation unit 21. The coefficients $A^{l,k}$ and $B^{l,k}$ denote the guaranty of the continuity of the stress and the velocity. As this analysis method, a (successive over relaxation (SOR) method is used.

In S15, the heat flow calculation unit 22 discretizes the following energy equation using the finite difference method in the thickness direction and the 2.5-dimensional finite element weighted residual method in the flow direction.

$$\rho^l \left( \frac{1}{J} \frac{\partial JUT^l}{\partial \xi} + \frac{1}{J} \frac{\partial JVT^l}{\partial \eta} \right) = \kappa \frac{\partial^2 T^l}{\partial h^2} + \eta_{vis}^l (\dot{\gamma}^l)$$ [Formula 13]

In the discretization by the finite difference method, a control volume for a difference grid illustrated in FIG. 6 is used. A heat conduction difference equation in the thickness direction is a simultaneous equation using a tridiagonal matrix and coefficients. This simultaneous equation can be analyzed for each element. On the other hand, a thermal convection term includes a relationship of temperature information between adjacent elements and is a simultaneous equation of a whole system, and thus is analyzed using a successive over relaxation method (SOR method).

The heat flow calculation unit 22 calculates α and β expressed by Formula 12 (S16). Here, the viscosity is evaluated by a nonlinear model depending on the strain rate and the temperature. The difference lattice point illustrated in FIG. 6 is used as an integral value of the viscosity, and the temperature is used in the value calculated in S15. Further, the strain rate gradient uses the following relationship obtained by dividing both sides of Formula 8 by the viscosity $\eta^{l,k}_{vis}$.

$$\frac{\partial u_i^{l,k}}{\partial h} = p_{,i}^l \frac{h}{\eta_{vis}^{l,k}} + \frac{A_i^{l,k}}{\eta_{vis}^{l,k}}$$ [Formula 14]

The heat flow calculation unit 22 recalculates the pressure in each layer by analyzing the following pressure equation, etc. (S17).

$$S^l_{\alpha\beta} p^l_{,\beta} + Q^l_{,\alpha} + F^l_{,\alpha} = 0 \text{ for } l=1 \sim n$$ [Formula 15]

In S12, F is set to 0 (zero) to calculate the initial value in Formula 3. However, in the case of calculating the actual pressure, the pressure p is calculated by adding the coefficient F depending on α and β calculated in S16.

The heat flow calculation unit 22 calculates the flow rate Q at each node by Formula 15 using the pressure obtained in S17 (S18). Further, the heat flow calculation unit 22 calculates the flow velocity at each node based on Formula 10. The controller 2 determines whether or not the calculated various calculated values converge (S19). For example, when it is determined that a value calculated at a kth time and a value calculated at a (k+1)th time are different values to some extent, the controller 2 determines that the values do not converge (S19: NO), and the process returns to S13 to perform the calculations again. On the other hand, when the value calculated at the kth time and the value calculated at the (k+1)th time are compared and determined to be substantially the same or within a prescribed range, the controller 2 determines that the various calculated values converge (S19: YES), and a calculation flow is ended.

In the multilayer fluid analysis program 31 in the embodiment, the calculation result satisfies Formula 6 corresponding to a balance equation of stress in the normal direction, Formula 9 corresponding to a balance equation of the tangential stress, and Formula 11 which guarantees continuity of the velocity at each boundary between the first layer L1, the second layer L2, and the third layer L3 in the multilayer fluid. Note that at the finite difference lattice points of FIG. 6, Formula 7 corresponding to an equation of motion of the fluid is satisfied.

Figure 11:
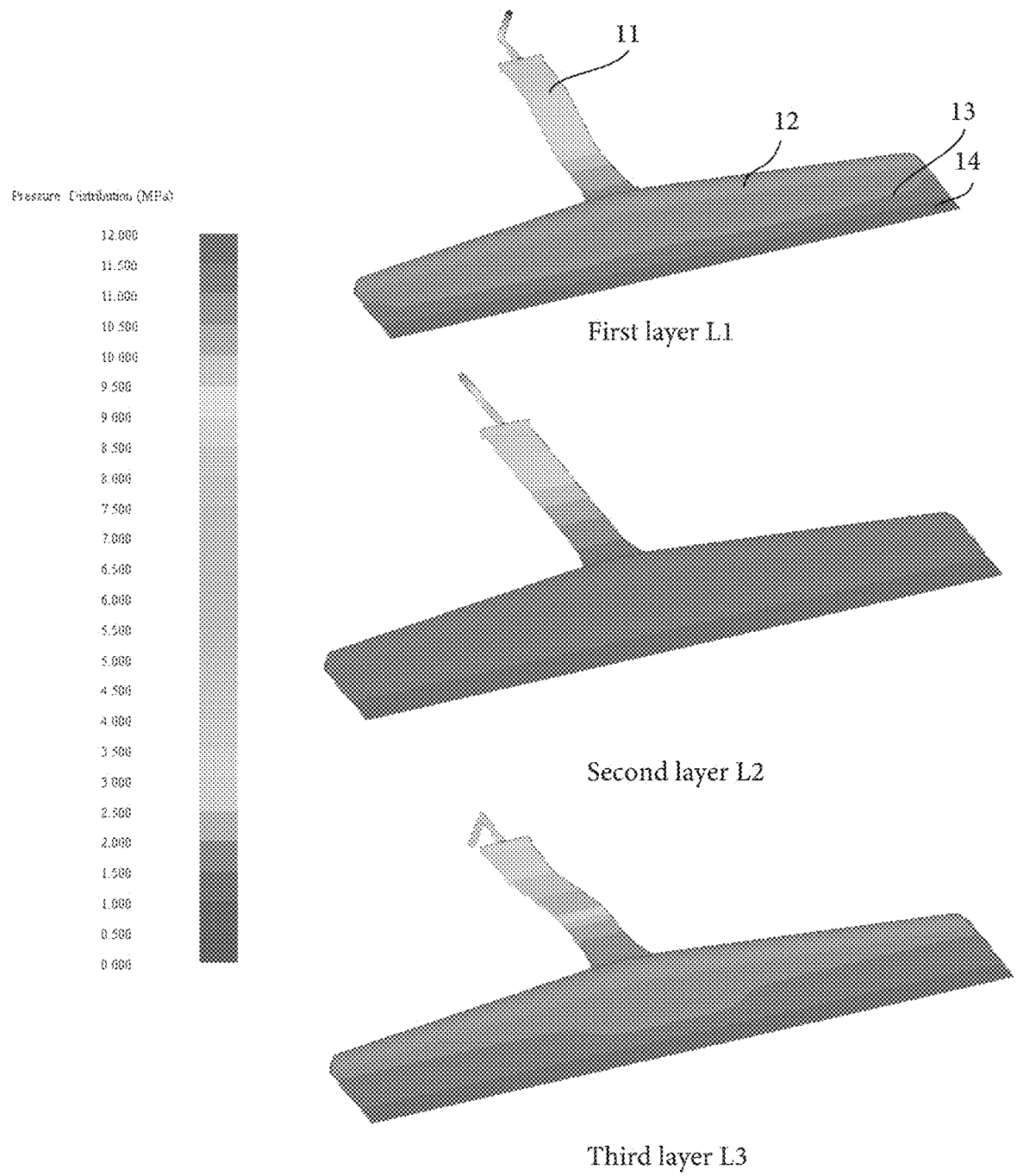
FIG. 11 is an analysis result of the pressure distribution for each layer in the T-die displayed in the display unit of the multilayer fluid analysis system according to the embodiment.
Figure 12:
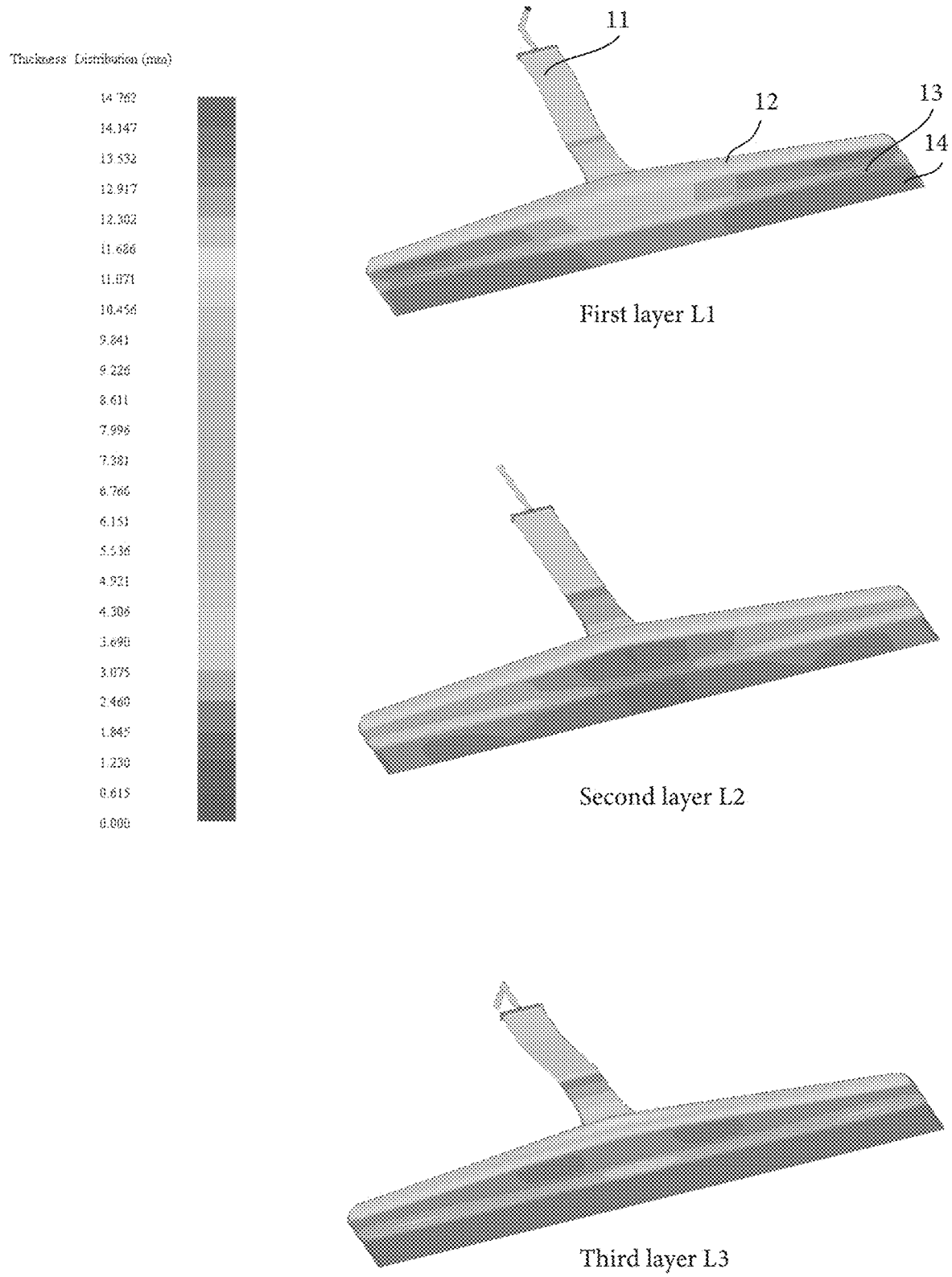
FIG. 12 is an analysis result of the thickness distribution for each layer in the T-die displayed in the display unit according to the embodiment.
Figure 13:
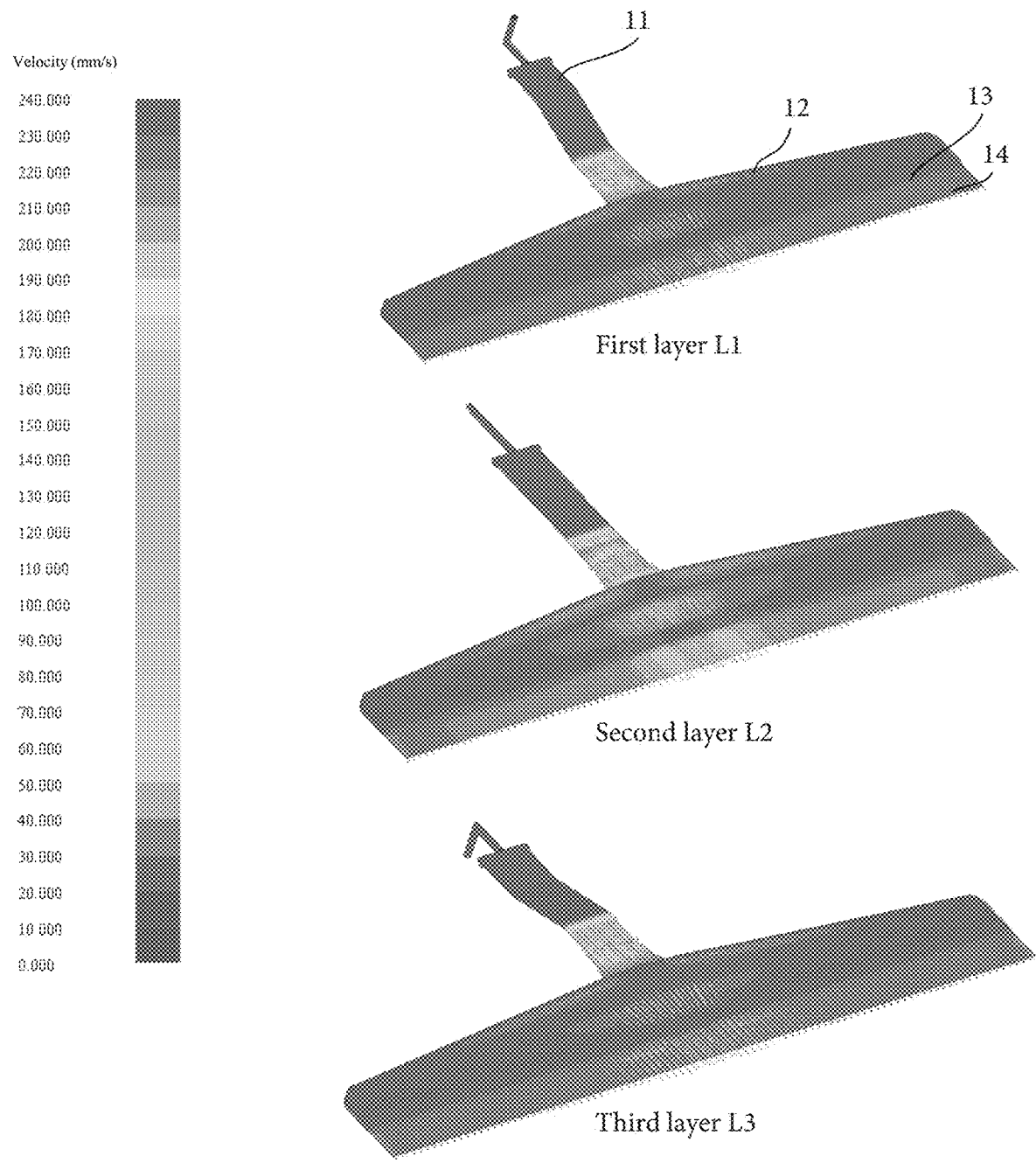
FIG. 13 is an analysis result of the velocity distribution for each layer in the T-die displayed in the display unit according to the embodiment.

The controller 2 displays the analysis result T-die model calculated in S4 on the display unit 5 as illustrated in FIG. 11 to FIG. 13 (S5). In the embodiment, with regard to the flow of the resin inside the T-die, heat flow data such as the layer thickness, the layer pressure, the flow velocity, etc., from the upstream side to the downstream side of the junction P is displayed for each layer in the TD and the MD. In addition, heat flow data such as the temperature can be displayed. In the multilayer fluid analysis in 2.5 dimensions according to the embodiment, the calculation time required for the analysis depends on the performance of the PC, and is less than 10 minutes in a low-cost PC environment.

In the embodiment, the multilayer fluid analysis is performed under the following conditions. Note that the layer thickness after joining of the T-die is 3 mm.

TABLE 1

|  | Viscosity [Pa · s] | Thickness of path [mm] | Extrusion amount [kg/h] |
|---|---|---|---|
| First layer L1 | 1000 | 5 | 18 |
| Second layer L2 | 3000 | 5 | 18 |
| Third layer L3 | 2000 | 5 | 18 |

As illustrated in FIG. 11, the pressure decreases toward the downstream side in any of the first layer L1, the second layer L2, and the third layer L3. Since the viscosity of the second layer L2 is the highest as illustrated in Table 1, the pressure of the second layer L2 is slightly lower than that of the first layer L1 and the third layer L3 in the vicinity of the manifold portion 12 and the choke portion 13. Further, since the extrusion amounts are the same in each layer, the pressure distribution on the upstream side of the junction P is substantially the same for each layer.

As illustrated in FIG. 12, in the first layer L1, after passing through the manifold portion 12, the thickness of the central portion is thicker than that of both sides in the TD. In the second layer L2, after passing through the manifold portion 12, the layer thickness at the central portion is thinner than that of both sides in the TD. In the third layer L3, after passing through the manifold portion 12, the layer thickness becomes thinner at positions slightly away from the central portion in the TD. In each layer, the thickness at the manifold portion 12 and the choke portion 13 is thicker than the thickness at the lip land portion 14.

As illustrated in FIG. 13, after passing through the manifold portion 12, the flow velocity at the central portion of the second layer L2 is higher than that of the other two layers. In each layer, the flow velocity in the central portion of the choke portion 13 and the lip land portion 14 is faster than the flow velocity in the other portions. In addition, in each layer, the flow velocity from the junction P to the resin inflow portion 11 is the fastest.

Figure 14:
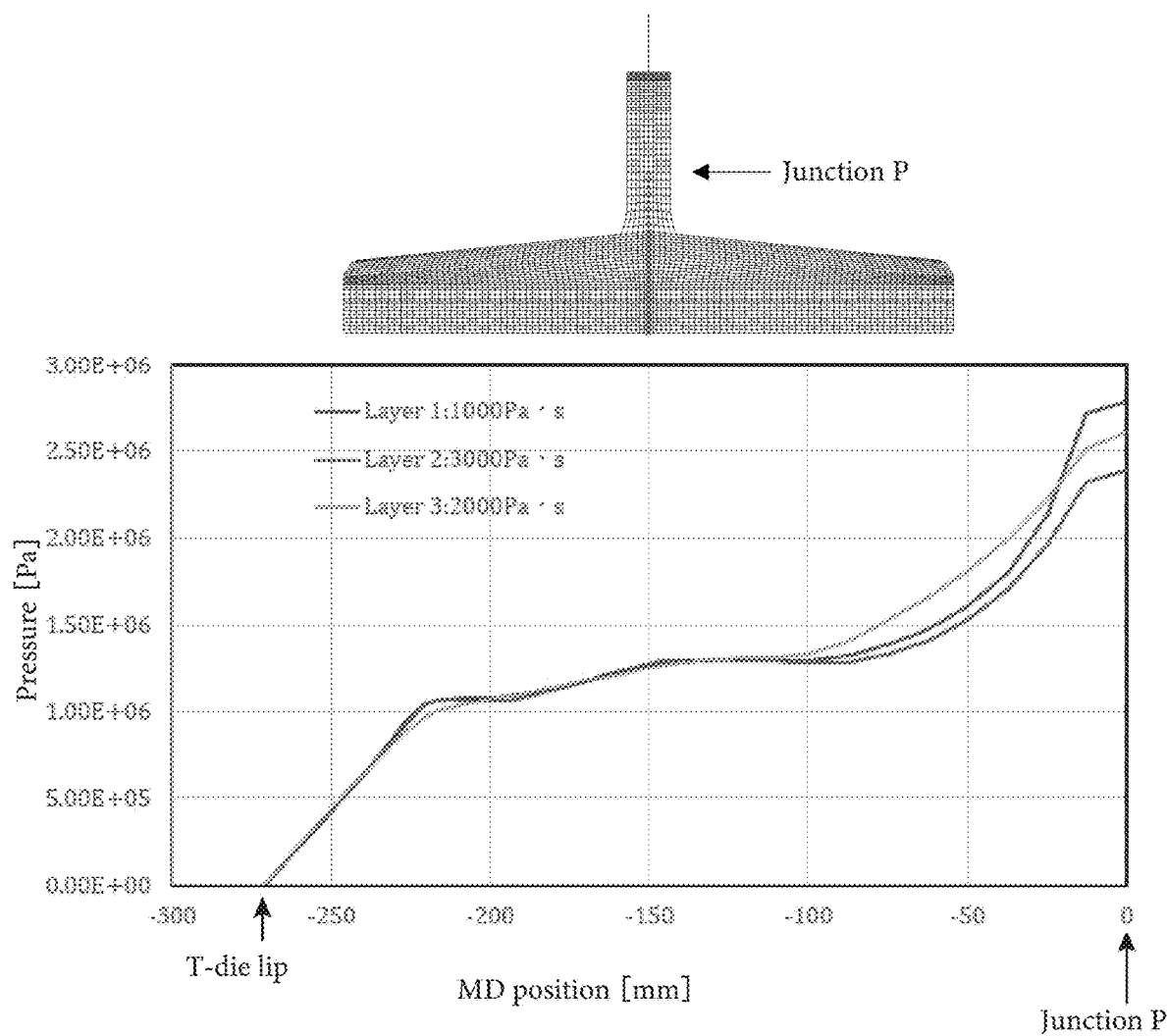
FIG. 14 is a graph illustrating a pressure distribution of each layer along the MD at a center of the T-die according to the embodiment.

FIG. 14 is a graph illustrating a pressure distribution of each layer at the central portion of the T-die. When the position in the MD is between 0 and −100 mm, there is a difference in pressure between the third layer L3, the second layer L2, and the first layer L1. Since the interface between the respective layers is in an undeveloped state, the pressure of each layer is not equal. Even at this time, the stress in the normal direction at each interface is balanced. When the position in the MD passes through −150 mm, the pressure of each layer becomes stable and is in the developmental state. In the multilayer fluid analysis program 31, the analysis result is output so that the stress in the normal direction satisfies the balancing equation of Formula 6.

Figure 15:
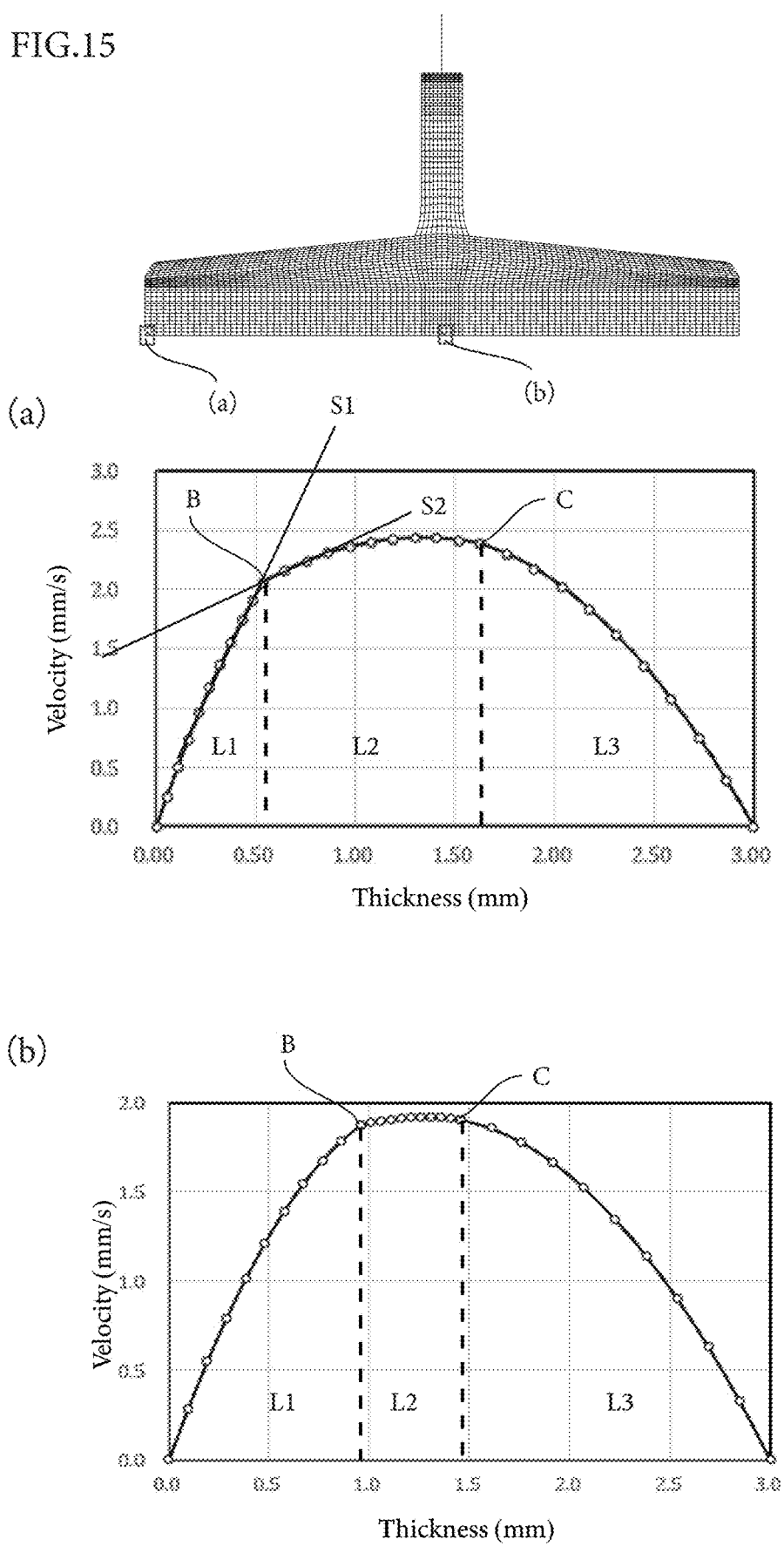
FIG. 15 is a graph illustrating the flow velocity in the thickness direction at an end of the T-die and at the center of the T-die according to the embodiment.

FIG. 15 is a graph illustrating the flow velocity in the thickness direction at an end of the T-die in graph (a), and at a center of the T-die in graph (b). At the interface B between the first layer L1 and the second layer L2 in graph (a), an inclination of a second tangent S2 in the second layer L2 is about ⅓ of an inclination of a first tangent S1 in the first layer L1, since, as shown in Formula 9, a value obtained by multiplying the viscosity of the first layer L1 by the inclination of the first tangent S1 at the interface B is equal to a value obtained by multiplying the viscosity of the second layer L2 by the inclination of the second tangent S2 at the interface B. That is, since the viscosity of the first layer L1 is ⅓ of the viscosity of the second layer L2, the inclination of the second tangent S2 is ⅓ of the inclination of the first tangent S1. The same is true with respect to an interface C between the second layer L2 and the third layer L3. Therefore, the analysis result is output so as to satisfy the balancing equation of Formula 9 with respect to the tangential stress in the multilayer fluid analysis program 31.

The velocity is continuous at the interface B between the first layer L1 and the second layer L2 and at the interface C between the second layer L2 and the third layer L3. Therefore, the analysis result is output so as to satisfy a velocity continuity condition of Formula 11 without slipping at each interface in the multilayer fluid analysis program 31. This description is similarly applied to the central portion of the T-die illustrated in graph (b).

Figure 16:
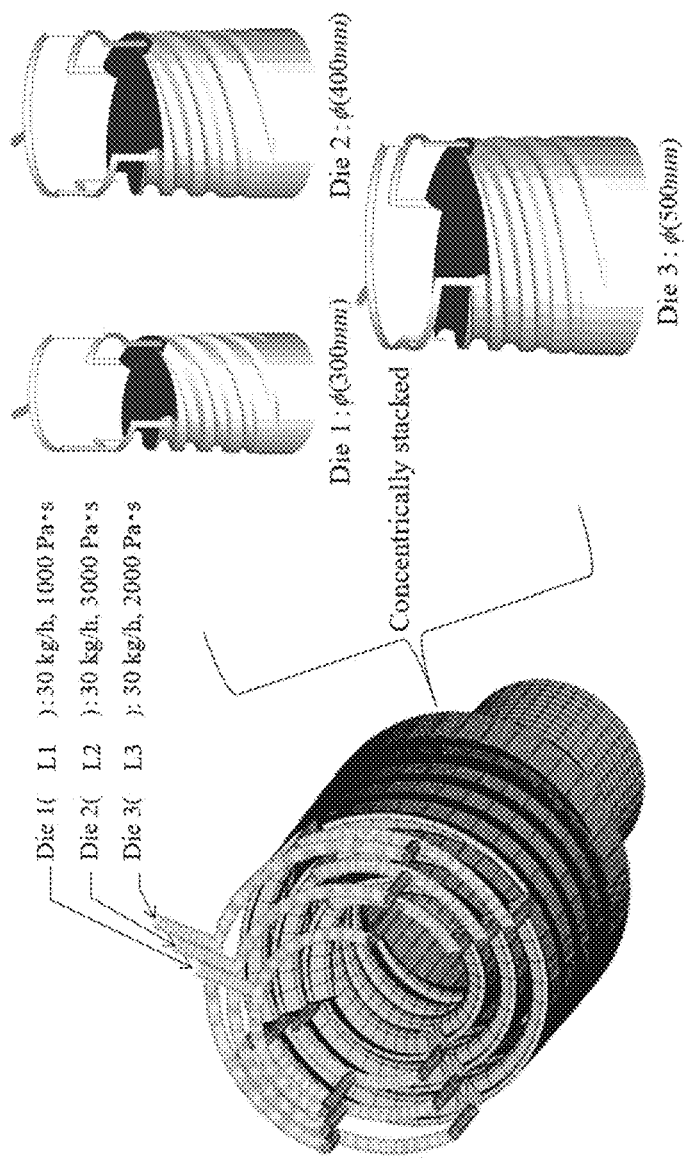
FIG. 16 is a schematic diagram of a spiral mandrel die of the multilayer fluid analysis system according to the embodiment.

Next, a description will be given of a result of analyzing a three-layer spiral mandrel die using the multilayer fluid analysis system 1 in the embodiment with reference to FIGS. 16 to 21. The spiral mandrel die includes a die 1 having a diameter of 300 mm, a die 2 having a diameter of 400 mm, and a die 3 having a diameter of 500 mm as illustrated in FIG. 16. Various conditions in the three-layer fluid analysis are as follows.

TABLE 2

|  | Viscosity [Pa · s] | Diameter [mm] | Extrusion amount [kg/h] |
| --- | --- | --- | --- |
| First layer L1 | 1000 | 300 | 30 |
| Second layer L2 | 3000 | 400 | 30 |
| Third layer L3 | 2000 | 500 | 30 |

Figure 17:
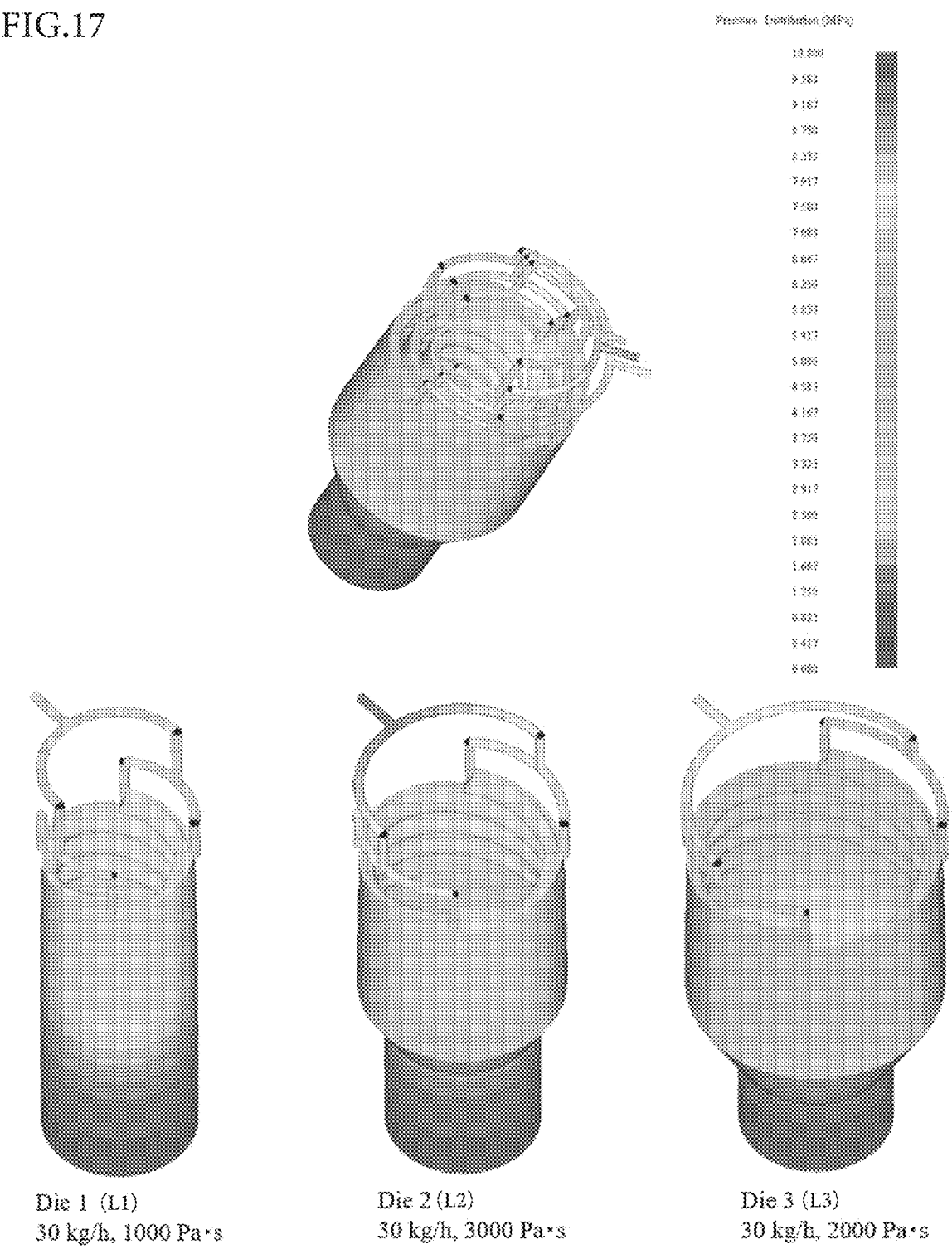
FIG. 17 is an analysis result of the pressure distribution for each layer in the spiral mandrel die displayed in the display unit according to the embodiment.
Figure 18:
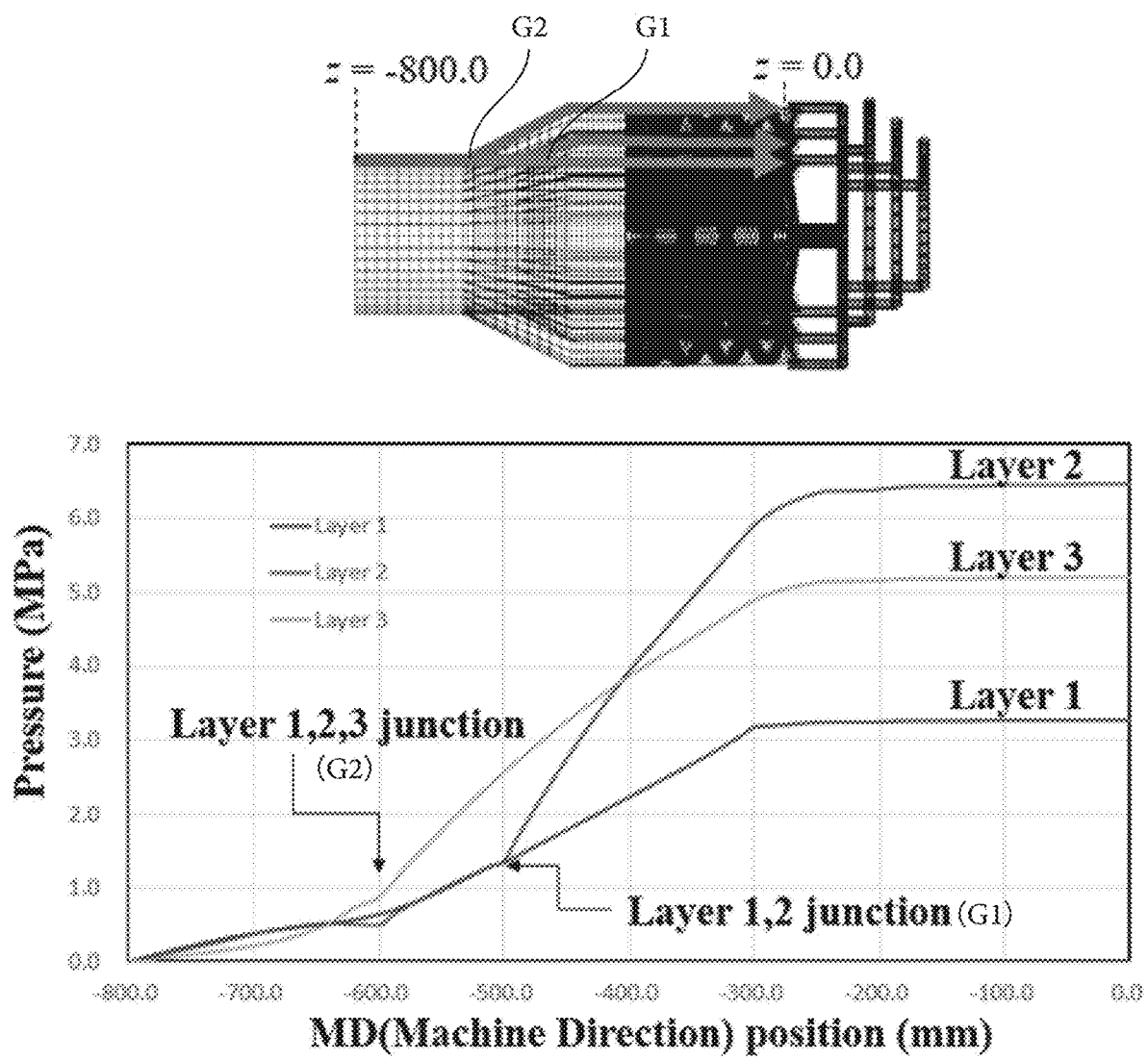
FIG. 18 is a graph illustrating a pressure distribution of each layer along the MD in the spiral mandrel die according to the embodiment.

As illustrated in FIG. 17, the pressure decreases toward the downstream side in all of the first layer L1, the second layer L2, and the third layer L3. Since the viscosity of the second layer L2 is the highest, the pressure of the second layer L2 near a junction port is slightly higher than that of the first layer L1 and the third layer L3. As illustrated in the graph of FIG. 18, when the pressure distribution in the MD in the spiral mandrel die is focused, the pressures of respective layers coincide with each other and joining occurs in the developmental state at the junction G1 of the first layer L1 and the second layer L2. On the other hand, at the junction G2 of the first and second layers L1 and L2 and the third layer L3, the pressures of the respective layers do not coincide with each other and joining occurs in the undeveloped state. In particular, the sign of the pressure gradient of the second layer L2 near the junction G2 is opposite to that of the pressure gradient of the first layer L1 and the third layer L3.

Figure 19:
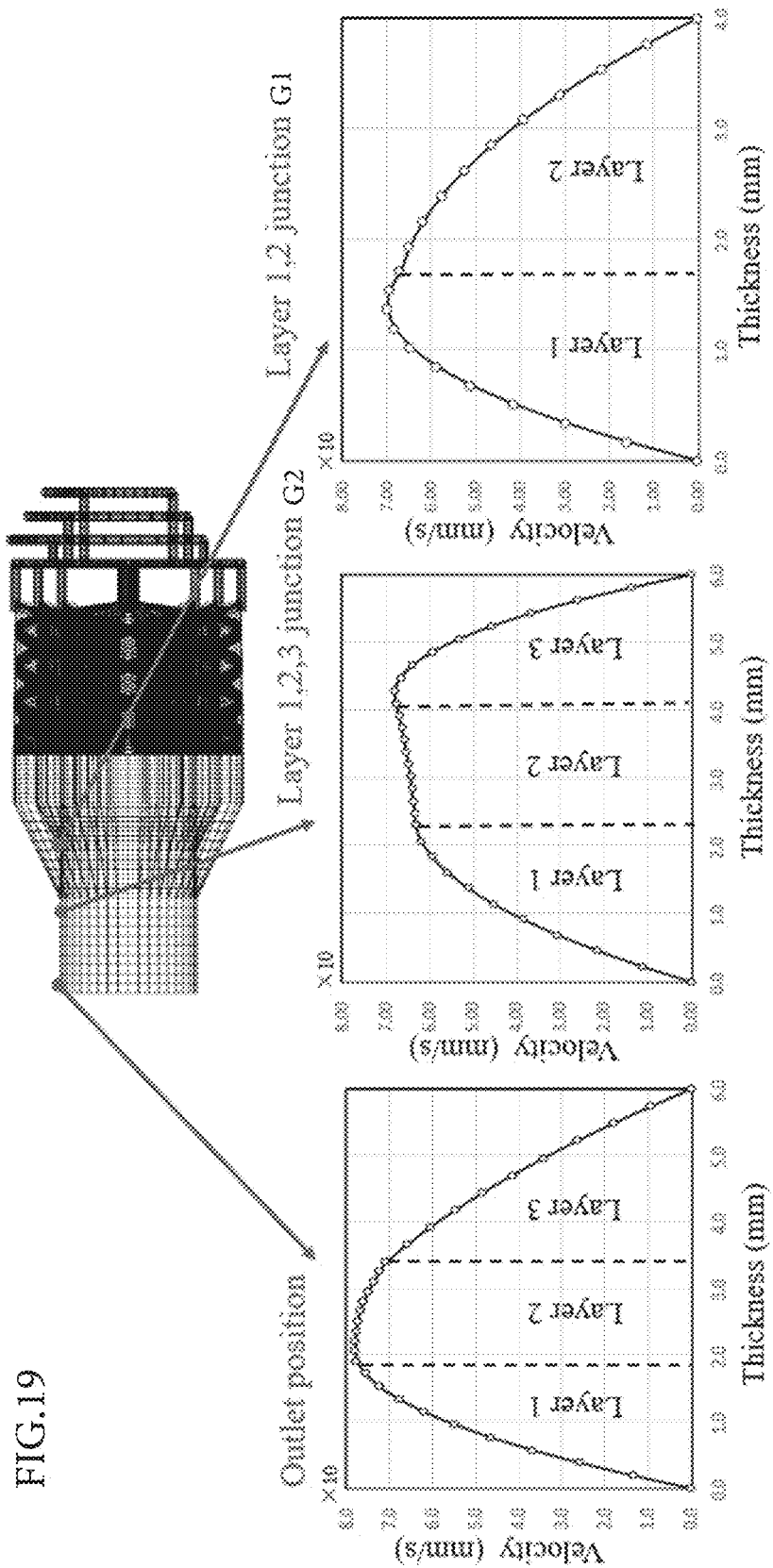
FIG. 19 is a graph illustrating a flow velocity in the thickness direction at a junction G1, a junction G2, and an outlet of the spiral mandrel die according to the embodiment.

FIG. 19 is a graph illustrating a flow velocity in the thickness direction at the junction G1, at the junction G2, and at an outlet position in the spiral mandrel die. In each layer, the flow velocity is continuous at each interface in the same manner as that of T-die. Similarly to FIG. 15, an analysis result of an inclination of a tangent at the boundary between the first layer L1 and the second layer L2 is output to satisfy the balancing equation of Formula 9 with respect to the tangential stress. Since each layer is in the undeveloped state at the junction G2, the flow velocity distribution of the second layer L2 behaves differently from the flow velocity distribution thereof at the outlet position. The sign of the pressure gradient of the second layer L2 is reversed at the junction G2 of FIG. 18 since the second layer L2 is transported downstream while being pulled by the first layer L1 and the third layer L3 at the Junction G2.

Figure 20:
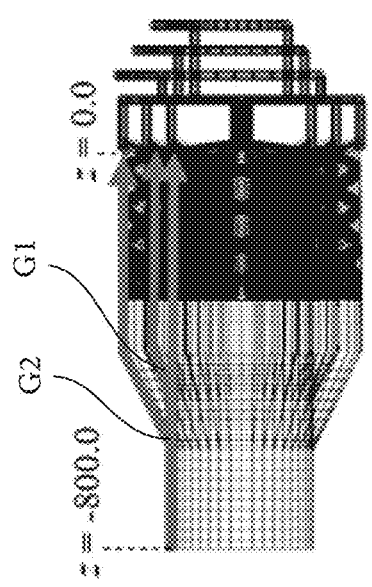
FIG. 20 is a graph illustrating a thickness distribution of each layer along the MD in the spiral mandrel die according to the embodiment.
Figure 20:
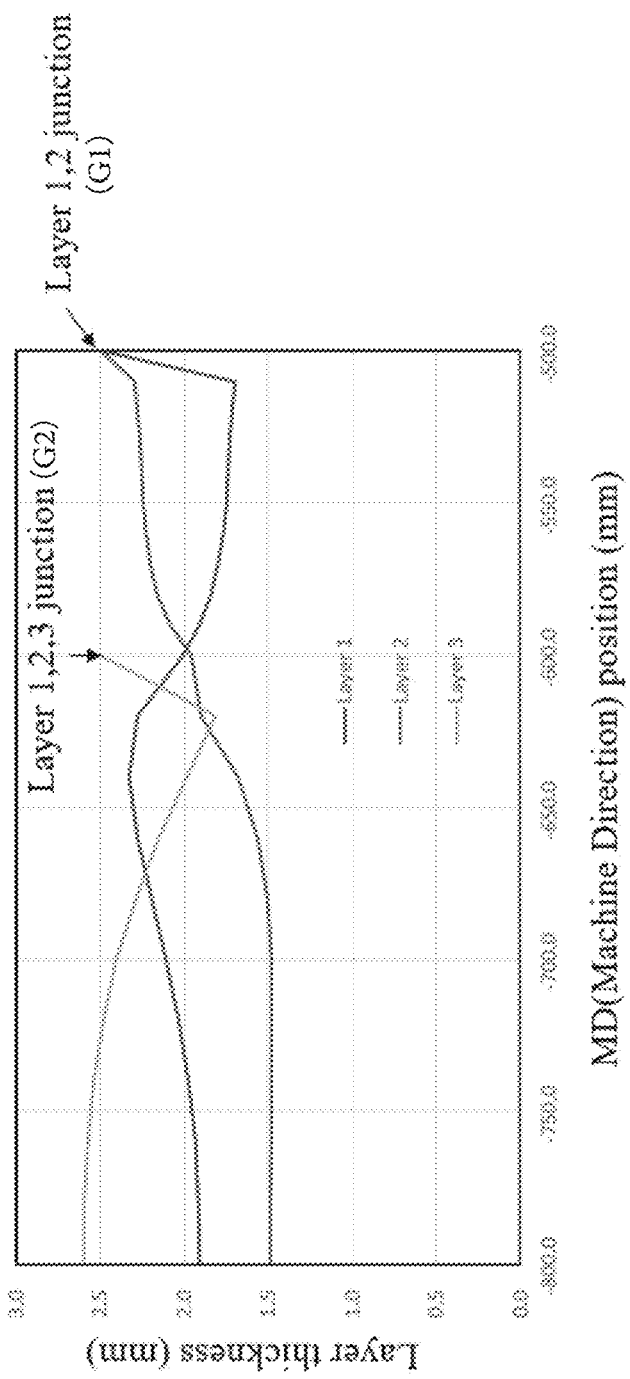
Figure 21A:
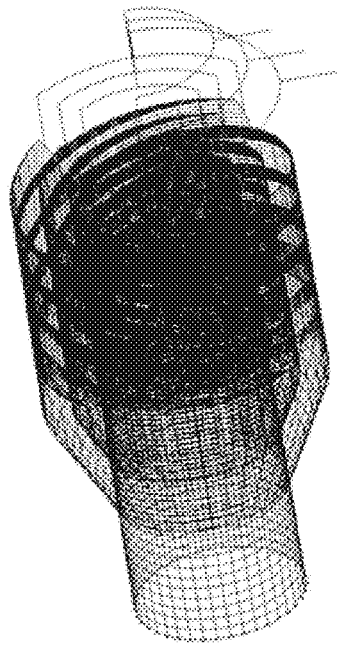
FIG. 21A is a graph illustrating a thickness distribution of each layer along the CD at the outlet of the spiral mandrel die.
Figure 21A:
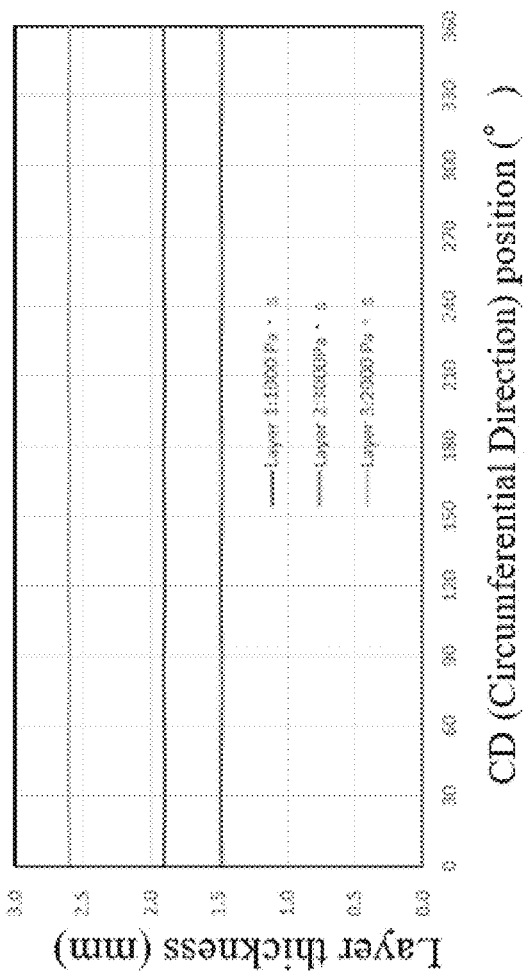
Figure 21B:
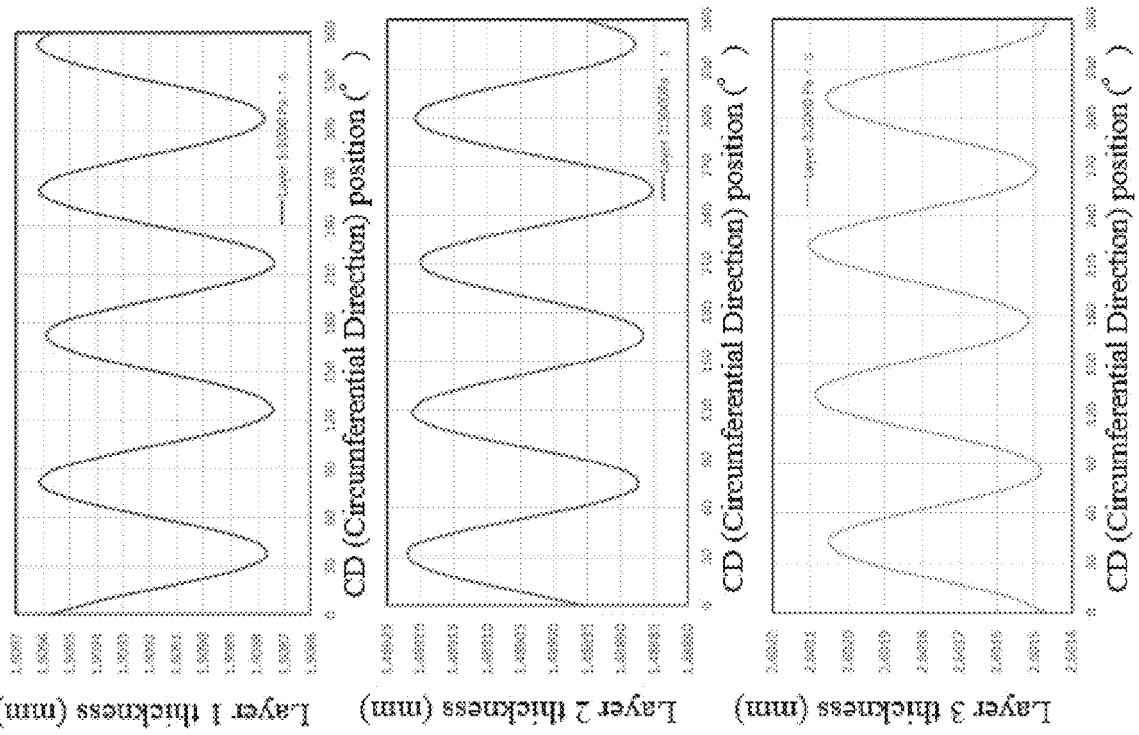
FIG. 21B is an enlarged graph of the thickness distribution of a first layer, a second layer, and a third layer along the CD according to the embodiment.

As illustrated in FIG. 20, in a region where there is a difference in pressure distribution, the thickness distribution of each layer fluctuates toward the downstream side. FIG. 21A represents a thickness distribution in a circumferential direction (CD) at the outlet of the spiral mandrel die, and FIG. 21B is an enlarged view of FIG. 21A corresponding to a thickness distribution of the first layer L1 the second layer L2, and the third layer L3 in the CD. According to the multilayer fluid analysis system 1 of the embodiment, it is possible to quantify the variation in the distribution of the thickness of each layer in the CD, which is regarded as engineeringly important. In addition, four peaks are seen in the CD in FIG. 21B, which are considered to be due to an influence of an inflow port in each layer of the spiral mandrel die.

Figure 22:
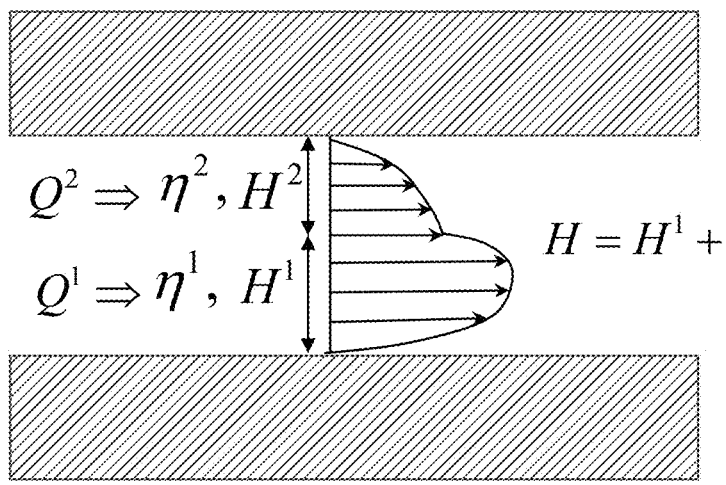
FIG. 22 is a schematic diagram illustrating two-layer viscous flow of a parallel plate.

Next, it is verified whether the analysis method of the multilayer fluid analysis system 1 is theoretically correct with reference to FIGS. 22 to 24. As a theoretical analysis model for examining the validity of the formulation in the multilayer fluid analysis system 1, a steady two-layer viscous flow between parallel plates illustrated in FIG. 22 is analyzed.

From the layer thickness $H^1$, the flow rate $Q^1$, and the viscosity $\eta^1_{vis}$ of the first layer L1, and the layer thickness $H^2$, the flow rate $Q^2$, and the viscosity $\eta^2_{vis}$ of the second layer L2, a layer pressure ratio $\chi_h$, a flow rate ratio $\chi_q$, and a viscosity ratio $\chi_\eta$, are defined as illustrated in FIG. 22. It is theoretically known that this two-layer viscous flow satisfies the following algebraic relational expression in a developmental state.

$$\chi_h^4 = -4\chi_\eta \chi_h^3 - 3(\chi_\eta - \chi_q \chi_\eta)\chi_h^2 + 4\chi_q \chi_\eta \chi_h + \chi_q \chi_\eta^2 \quad \text{[Formula 16]}$$

Figure 23A:
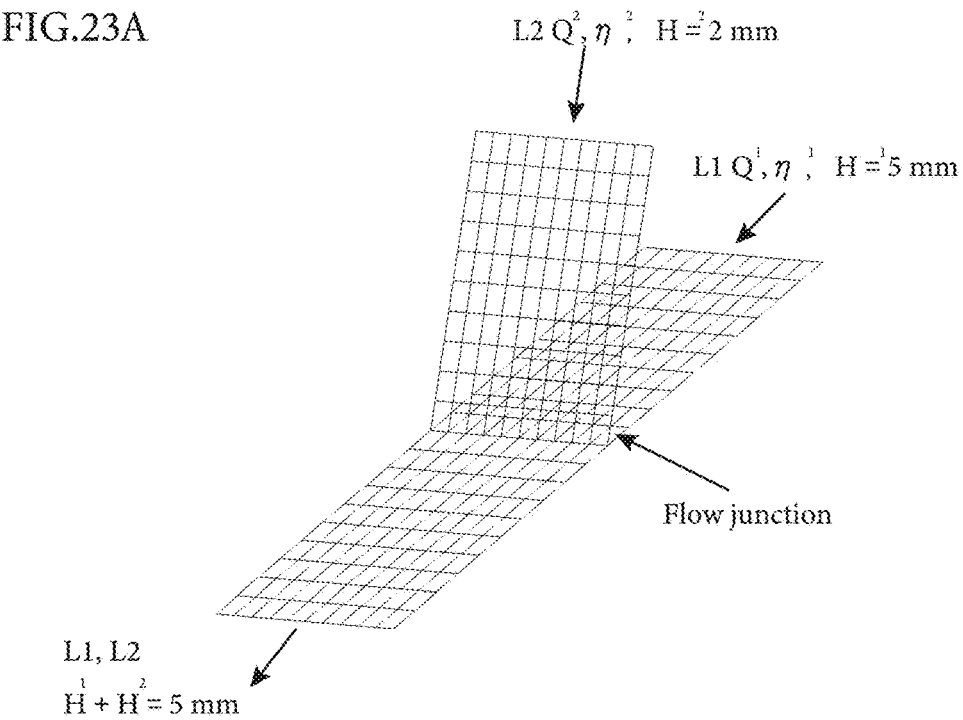
FIG. 23A is a diagram illustrating a simplified 2.5-dimensional multilayer fluid model.

As illustrated in FIG. 23A, a simplified 2.5-dimensional multilayer fluid model with joining on the upstream side is used as a theoretical verification model. In the theoretical verification model, the layer thickness was set to $H^1$=5 mm, the layer pressure was set to $H^2$=2 mm, and a layer thickness at a final outlet was set to $H^1+H^2$=5 mm.

Figure 23B:
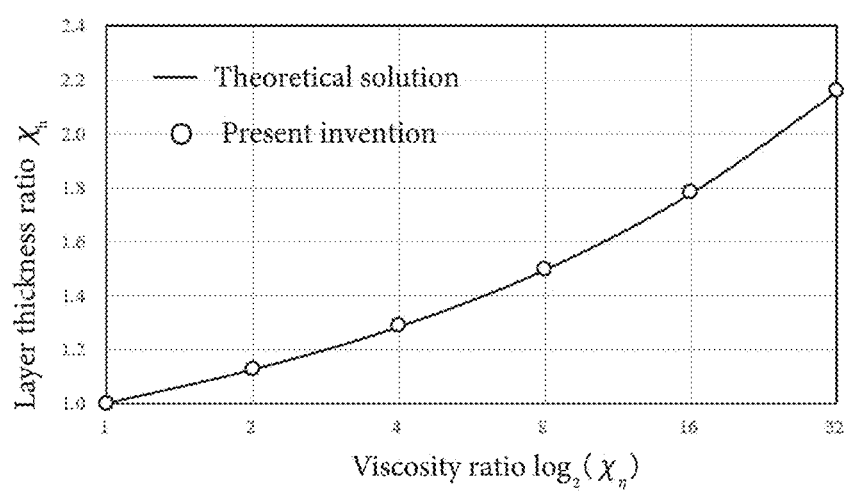
FIG. 23B is a graph between a layer thickness ratio and a viscosity ratio.
Figure 23C:
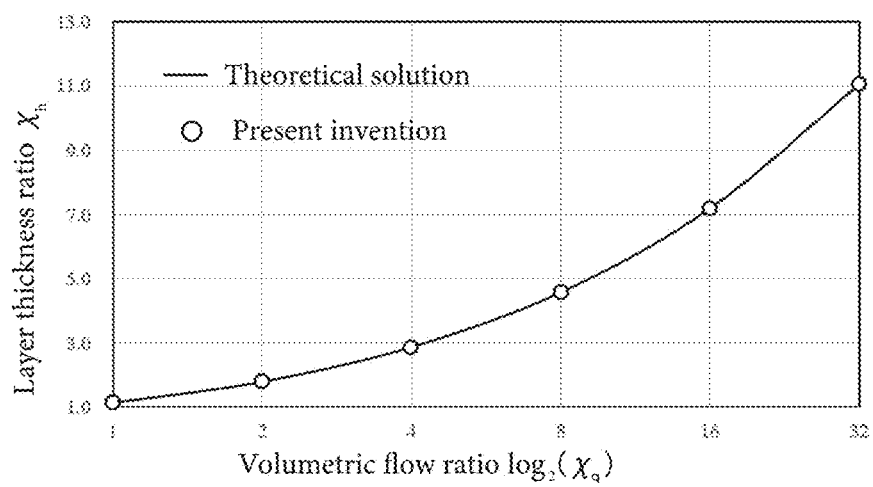
FIG. 23C is a graph between the layer thickness ratio and a volumetric flow ratio.

In FIG. 23B, a solid line indicates a relationship between a velocity ratio $\log_2(\chi_\eta)$ and a layer thickness ratio $\chi_h$ when $\chi_q$=1 in Formula 16, and a white point indicates the analysis result by the multilayer fluid analysis system 1. Similarly, in FIG. 23C, a solid line indicates a relationship between a velocity ratio $\log_2(\chi_\eta)$ and a layer thickness ratio $\chi_h$ when $\chi_\eta$=2 in Formula 16, and a white point indicates an analysis result by the multilayer fluid analysis system 1. As illustrated in FIGS. 23B and 23C, since the analysis result by the multilayer fluid analysis system 1 represented by the white point substantially coincides with a theoretical value calculated from Formula 16 represented by the solid line, which indicates that the analysis method by the multilayer fluid analysis system 1 can be applied to a multilayer viscous flow in the developmental state.

Figure 24B:
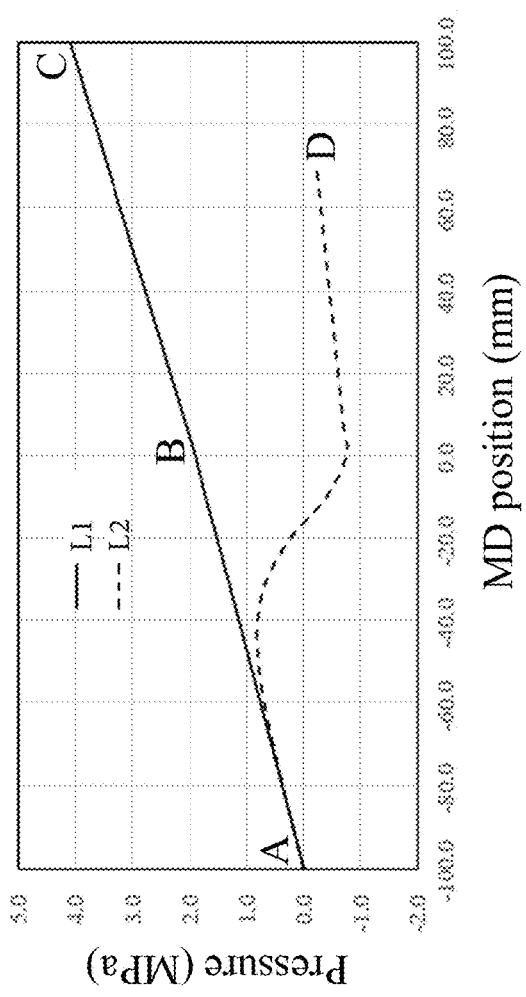
FIG. 24B is a graph illustrating a pressure distribution in the MD direction.
Figure 24A:
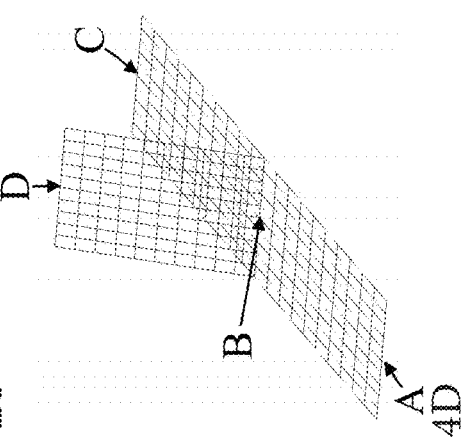
FIG. 24A is a diagram illustrating the simplified 2.5-dimensional multilayer fluid model.
Figure 24C:
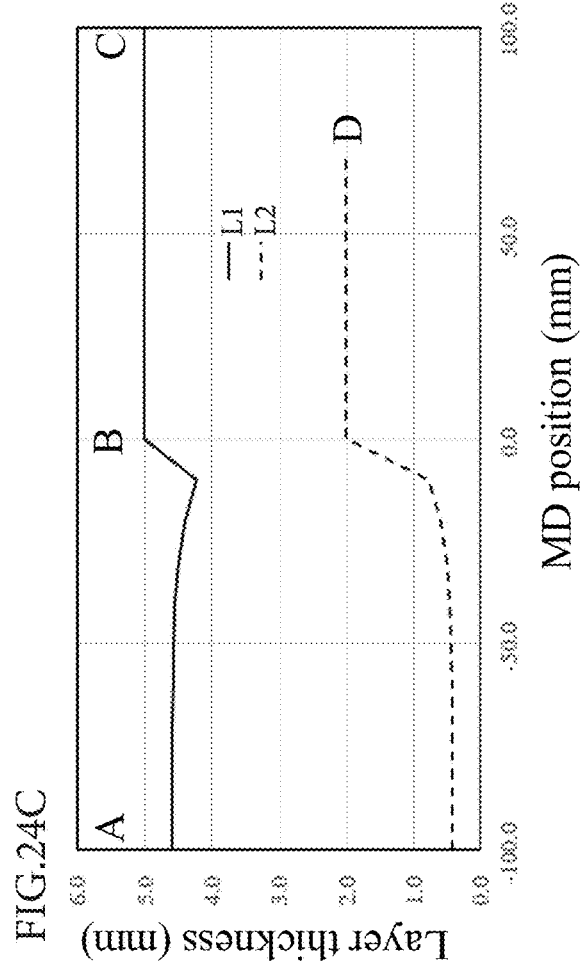
FIG. 24C is a graph illustrating a thickness distribution in the MD.

FIGS. 24A to 24D illustrate results of analysis performed by the multilayer fluid analysis system 1 on a 2.5-dimensional multilayer fluid model under the conditions of a flow rate ratio $\chi_q$=32 and a viscosity ratio $\chi_\eta$=2. As illustrated in FIG. 24B, in a region immediately after the junction B, the pressure between the respective layers changes, and discontinuity is confirmed. The pressure of the first layer L1 indicated by a solid line naturally drops toward the downstream side, while the pressure of the second layer L2 indicated by a dotted line rises conversely. That is, the sign of the pressure gradient of second layer L2 reverses with respect to that of first layer L1. As illustrated in FIG. 24C, in a region from the junction B to the downstream side, the layer thicknesses of the first layer L1 and the second layer L2 greatly change due to the pressure discontinuity illustrated in FIG. 24B.

Figure 24D:
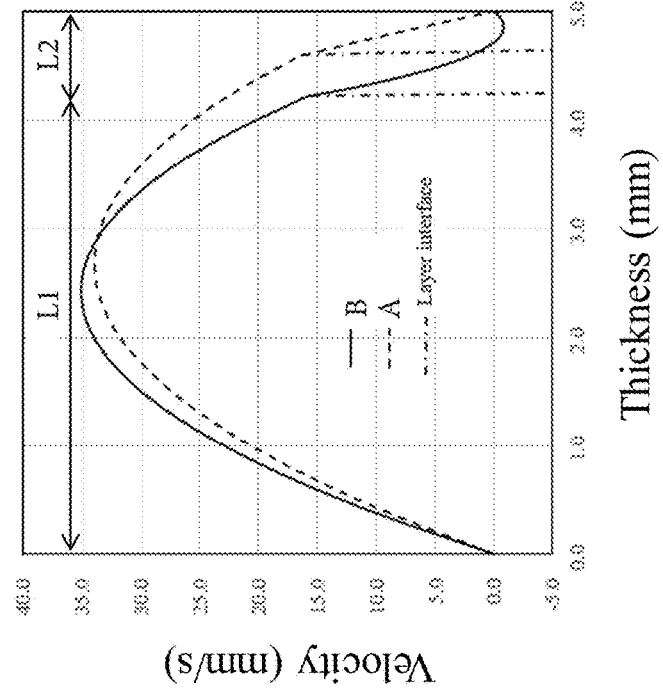
FIG. 24D is a graph illustrating a velocity distribution in the thickness direction.

In FIG. 24D, a flow velocity distribution at the junction B is indicated by a solid line, a flow velocity distribution at an outlet A is indicated by a dotted line, and the boundary between the first layer L1 and the second layer L2 is indicated by a chain line. As shown in Formula 7, considering that the second derivative in the thickness direction of the flow velocity distribution coincides with the pressure gradient, the flow velocity distribution at the junction B of FIG. 24D appears as a difference in unevenness between the first layer L1 and the second layer L2. That is, a rise in the pressure of the second layer L2 (reversal of the pressure gradient) after passing the junction B of FIG. 24B results from a convex downward of the second layer L2 at the junction B of FIG. 24D.

At the junction B, in the vicinity of the boundary indicated by the chain line, the second layer L2 has an excessive flow rate transported by being pulled and flowing by the first layer L1 having a relatively large flow rate and viscosity. As a result, in the vicinity of the wall surface of the second layer L2, a reverse flow region where the velocity is partially negative is generated, and the balance of the inflow and outflow balance is maintained. By this verification, it was numerically confirmed that even in such an undeveloped state, the continuity of the flow velocity and the shear stress, and the balance of the inflow and outflow are accurately established. As illustrated in FIG. 24B and FIG. 24C, the pressure discontinuity and the change in the layer thickness observed immediately after the junction B are gradually resolved toward the downstream side, and finally approach the developmental state. As described above, the formulation of the multilayer viscous fluid in the multilayer fluid analysis system 1 is applicable to the multilayer flow analysis including the undeveloped state, and it is possible to theoretically correctly represent the multilayer flow in the developmental state as an asymptotic solution.

According to such a configuration, in the finite element model of the multilayer fluid, the state of the multilayer fluid is analyzed as 2.5 dimensions in which each element has layer thickness information. Thus, when compared to the 3D multilayer fluid analysis, the content of analysis can be simplified and the amount of calculation can be reduced, thereby reducing the time until the result is output. In addition, since the element e has the layer thickness information and does not consider the flow of the fluid in the thickness direction due to the fact of being 2.5-dimensional, a highly accurate result can be obtained while shortening the time until the result is output. In particular, in the case of a multilayer fluid of a thin object such as a film, the influence of the flow of the fluid in the thickness direction is reduced, and thus a highly accurate result can be obtained even when the influence of the flow is not considered.

Further, since the layer thickness and the pressure are calculated on the assumption that the stresses in the tangential direction and the normal direction are balanced and the flow velocity is continuous as shown in Formula 6, Formula 9, Formula 11, FIG. 14, and FIG. 15 at the interface of the respective elements, a highly accurate calculation result can be obtained. Since the conventional analysis has been performed based on a sufficient developmental state, there is no need to consider changes in stress in the tangential direction and the normal direction. On the other hand, since the analysis of the multilayer fluid analysis system 1 is performed from the upstream side of the junction P of each layer, the analysis is performed on the assumption that each layer is in an undeveloped state. That is, the analysis is performed on the assumption that the stress in the tangential direction and the normal direction in each layer changes, thereby obtaining an analysis result closer to an actual phenomenon.

In the conventional multilayer fluid analysis, since the analysis is performed on the assumption of the developmental state on the downstream side from the junction P of each layer, information about the layer thickness and heat flow of each layer near the junction P may not be obtained. However, according to the invention, the analysis results from the upstream side to the downstream side of the junction P are displayed, so that a wide range of information can be obtained.

The multilayer fluid analysis program, and the multilayer fluid analysis system according to the invention are not limited to the above-described embodiment, and various changes may be made within the scope of the invention described in the claims.

In the above-described embodiment, the multilayer fluid analysis of film processing in the T-die and the spiral mandrel die is performed. However, the invention is not limited thereto. When a multilayered viscous fluid analysis is used, the invention can be applied to extrusion molding, sheet molding, injection molding, inflation molding, blow molding, press molding, lamination processing, etc.

What is claimed is:

1. A computer-readable non-transitory storage medium storing a multilayer fluid analysis program for analyzing a multilayer fluid as 2.5 dimensions in which each layer is divided into elements and each of the elements has information about a layer thickness in a finite element model for the multilayer fluid, the multilayer fluid analysis program allowing a computer to function as:
   a layer thickness calculation process for calculating the layer thickness of the elements from a simultaneous equation indicating a relationship between stress in a normal direction and a fluid viscosity in the elements as 2.5 dimensions without considering a fluid flow in a thickness direction of the layer thickness under a condition that stresses in the normal direction and a tangential direction are balanced at an interface of respective layers and a flow velocity at the interface is continuous to reduce computation cost; and
   a display process for displaying a calculation result of the layer thickness calculation process for each layer in a flow direction and a width direction of the multilayer fluid from an upstream side of a junction of each layer to a downstream side of the junction; wherein
   the layer thickness is calculated in the layer thickness calculation process by solving a balance equation of the stress in the normal direction represented by the following simultaneous equation:

$$-p^l + 2\eta^l_{vis}\frac{1}{h^l}\frac{dh^l}{dt} = -p^{l+1} + 2\eta^{l+1}_{vis}\frac{1}{h^{l+1}}\frac{dh^{l+1}}{dt} \text{ for } l = 1 \sim n-1 \qquad \text{Formula 1}$$

where p denotes a pressure in each layer, $\eta_{vis}$ denotes a viscosity, h denotes a layer thickness, l denotes a layer number, t denotes time such that dh/dt is a first derivative of h with respect to time, n is a coefficient and the Formula 1 is a simultaneous differential equation in which layers are simultaneous from a first layer to an lth layer.

2. A method for analyzing a multilayer fluid as 2.5 dimensions in which each layer is divided into elements and each of the elements has information about a layer thickness in a finite element model for the multilayer fluid, the method comprising:
   a layer thickness calculation step for calculating the layer thickness of the elements from a simultaneous equation indicating a relationship between stress in a normal direction and a fluid viscosity in the elements as 2.5 dimensions without considering a fluid flow in a thickness direction of the layer thickness under a condition that stresses in the normal direction and a tangential direction are balanced at an interface of respective layers and a flow velocity at the interface is continuous to reduce computation cost; and
   a display step for displaying a calculation result of the layer thickness calculation step for each layer in a flow direction and a width direction of the multilayer fluid from an upstream side of a junction of each layer to a downstream side of the junction;
   wherein the layer thickness is calculated in the layer thickness calculation step by solving a balance equation of the stress in the normal direction represented by the following simultaneous equation:

$$-p^l + 2\eta^l_{vis}\frac{1}{h^l}\frac{dh^l}{dt} = -p^{l+1} + 2\eta^{l+1}_{vis}\frac{1}{h^{l+1}}\frac{dh^{l+1}}{dt} \text{ for } l = 1 \sim n-1 \qquad \text{Formula 1}$$

where p denotes a pressure in each layer, $\eta_{ids}$ denotes a viscosity, h denotes a layer thickness, l denotes a layer number, t denotes time such that dh/dt is a first derivative of h with respect to time, n is a coefficient and the Formula 1 is a simultaneous differential equation in which layers are simultaneous from a first layer to an lth layer.

3. A multilayer fluid analysis system for analyzing a multilayer fluid as 2.5 dimensions in which each layer is divided into elements and each of the elements has information about a layer thickness in a finite element model for the multilayer fluid, the system comprising:
   a layer thickness calculation unit configured to calculate the layer thickness of the elements from an equation indicating a relationship between stress in a normal direction and a fluid viscosity in the elements as 2.5 dimensions without considering a fluid flow in a thickness direction of the layer thickness under a condition that stresses in the normal direction and a tangential direction are balanced at an interface of respective layers and a flow velocity at the interface is continuous to reduce computation cost; and
   a display unit configured to display a calculation result of the layer thickness calculation unit for each layer in a flow direction and a width direction of the multilayer fluid from an upstream side of a junction of each layer to a downstream side of the junction; wherein
   the layer thickness is calculated in the layer thickness calculation process by solving a balance equation of the stress in the normal direction represented by the following simultaneous equation:

$$-p^l + 2\eta^l_{vis}\frac{1}{h^l}\frac{dh^l}{dt} = -p^{l+1} + 2\eta^{l+1}_{vis}\frac{1}{h^{l+1}}\frac{dh^{l+1}}{dt} \text{ for } l = 1 \sim n-1 \qquad \text{Formula 1}$$

where p denotes a pressure in each layer, $\eta_{ids}$ denotes a viscosity, h denotes a layer thickness, l denotes a layer number, t denotes time such that dh/dt is a first derivative of h with respect to time, n is a coefficient and the Formula 1 is a simultaneous differential equation in which layers are simultaneous from a first layer to an lth layer.

* * * * *